US008085197B2

(12) United States Patent
Anand et al.

(10) Patent No.: US 8,085,197 B2
(45) Date of Patent: Dec. 27, 2011

(54) POSITION CALCULATING METHOD AND POSITION CALCULATING DEVICE

(75) Inventors: Kumar Anand, Nagano (JP); Yoshiyuki Muraguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 244 days.

(21) Appl. No.: 12/634,545

(22) Filed: Dec. 9, 2009

(65) Prior Publication Data

US 2010/0188284 A1    Jul. 29, 2010

(30) Foreign Application Priority Data

Jan. 26, 2009 (JP) .................. 2009-014577

(51) Int. Cl.
*G01S 19/37* (2010.01)
(52) U.S. Cl. ................................. 342/357.77
(58) Field of Classification Search ............ 342/357.77, 342/357.25, 357.35
See application file for complete search history.

(56) References Cited

U.S. PATENT DOCUMENTS 6,609,080 B1 *   8/2003  Syrjarinne ................. 702/150

OTHER PUBLICATIONS

Yaakov Bar-Shalom et al. Estimation with Applications to Tracking and Navigation, 2001, pp. 92-93 and 453-457, A Wiley-Interscience Publication, John Wiley & Sons, Inc., USA.

\* cited by examiner

*Primary Examiner* — Thomas Tarcza
*Assistant Examiner* — Fred H Mull
(74) *Attorney, Agent, or Firm* — Global IP Counselors, LLP

(57) ABSTRACT

A position calculating method includes: executing position calculation processing using a plurality of Kalman filter processing, which is processing corresponding to each of a plurality of power spectral density groups classified by performing in advance frequency analysis on the movement acceleration of a movable body as an object of position calculation and which includes an error parameter set to a different value according to the power spectral density group and a parameter indicating that the movable body is in a uniform motion state, on the basis of a satellite signal from a positioning satellite; and determining the position of the movable body using a position calculated by each Kalman filter processing.

5 Claims, 20 Drawing Sheets

[ POSITION CHANGE ALLOWANCE PARAMETER SMALL ]

TOLERANCE OF POSITION CHANGE SMALL

[ POSITION CHANGE ALLOWANCE PARAMETER LARGE ]

TOLERANCE OF POSITION CHANGE LARGE

|   | x | y | z | u | v | w | b | d |
|---|---|---|---|---|---|---|---|---|
| x | $\frac{Sp1 \cdot dt^3}{3}$ | 0 | 0 | $\frac{Sp1 \cdot dt^2}{2}$ | 0 | 0 | 0 | 0 |
| y | 0 | $\frac{Sp1 \cdot dt^3}{3}$ | 0 | 0 | $\frac{Sp1 \cdot dt^2}{2}$ | 0 | 0 | 0 |
| z | 0 | 0 | $\frac{Sp1 \cdot dt^3}{3}$ | 0 | 0 | $\frac{Sp1 \cdot dt^2}{2}$ | 0 | 0 |
| u | $\frac{Sp1 \cdot dt^2}{2}$ | 0 | 0 | $Sp1 \cdot dt$ | 0 | 0 | 0 | 0 |
| v | 0 | $\frac{Sp1 \cdot dt^2}{2}$ | 0 | 0 | $Sp1 \cdot dt$ | 0 | 0 | 0 |
| w | 0 | 0 | $\frac{Sp1 \cdot dt^2}{2}$ | 0 | 0 | $Sp1 \cdot dt$ | 0 | 0 |
| b | 0 | 0 | 0 | 0 | 0 | 0 | BiasQ | 0 |
| d | 0 | 0 | 0 | 0 | 0 | 0 | 0 | DriftQ |

SYSTEM NOISE MATRIX $Q_1$ FOR FIRST UNIFORM-SPEED KF MODEL

FIG. 8

|   | x | y | z | u | v | w | b | d |
|---|---|---|---|---|---|---|---|---|
| x | $\frac{Sp2 \cdot dt^3}{3}$ | 0 | 0 | $\frac{Sp2 \cdot dt^2}{2}$ | 0 | 0 | 0 | 0 |
| y | 0 | $\frac{Sp2 \cdot dt^3}{3}$ | 0 | 0 | $\frac{Sp2 \cdot dt^2}{2}$ | 0 | 0 | 0 |
| z | 0 | 0 | $\frac{Sp2 \cdot dt^3}{3}$ | 0 | 0 | $\frac{Sp2 \cdot dt^2}{2}$ | 0 | 0 |
| u | $\frac{Sp2 \cdot dt^2}{2}$ | 0 | 0 | $Sp2 \cdot dt$ | 0 | 0 | 0 | 0 |
| v | 0 | $\frac{Sp2 \cdot dt^2}{2}$ | 0 | 0 | $Sp2 \cdot dt$ | 0 | 0 | 0 |
| w | 0 | 0 | $\frac{Sp2 \cdot dt^2}{2}$ | 0 | 0 | $Sp2 \cdot dt$ | 0 | 0 |
| b | 0 | 0 | 0 | 0 | 0 | 0 | BiasQ | 0 |
| d | 0 | 0 | 0 | 0 | 0 | 0 | 0 | DriftQ |

SYSTEM NOISE MATRIX $Q_2$ FOR SECOND UNIFORM-SPEED KF MODEL

FIG. 9

| POSITION CALCULATION TIME | POSITION VECTOR | MOVING SPEED VECTOR | CLOCK BIAS | CLOCK DRIFT |
|---|---|---|---|---|
| t1 | (x1,y1,z1) | (u1,v1,w1) | b1 | d1 |
| t2 | (x2,y2,z2) | (u2,v2,w2) | b2 | d2 |
| t3 | (x3,y3,z3) | (u3,v3,w3) | b3 | d3 |
| ... | ... | ... | ... | ... |

NEW ↔ OLD

FIG.19

|   | x | y | z | u | v | w | b | d |
|---|---|---|---|---|---|---|---|---|
| x | 1 | 0 | 0 | dt | 0 | 0 | 0 | 0 |
| y | 0 | 1 | 0 | 0 | dt | 0 | 0 | 0 |
| z | 0 | 0 | 1 | 0 | 0 | dt | 0 | 0 |
| u | 0 | 0 | 0 | 1 | 0 | 0 | 0 | 0 |
| v | 0 | 0 | 0 | 0 | 1 | 0 | 0 | 0 |
| w | 0 | 0 | 0 | 0 | 0 | 1 | 0 | 0 |
| b | 0 | 0 | 0 | 0 | 0 | 0 | 1 | dt |
| d | 0 | 0 | 0 | 0 | 0 | 0 | 0 | 1 |

— MP3

STATE TRANSITION MATRIX $\Phi_V$ FOR UNIFORM-SPEED KF MODELS

FIG.23

POSITION CALCULATING METHOD AND POSITION CALCULATING DEVICE

CROSS-REFERENCE

The entire disclosure of Japanese Patent Application No. 2009-14577, filed Jan. 26, 2009 is expressly incorporated by reference herein.

BACKGROUND

1. Technical Field

The present invention relates to a position calculating method and a position calculating device.

2. Related Art

A GPS (global positioning system) is widely known as a positioning system using a positioning signal and is used for a position calculating device built into a mobile phone, a car navigation apparatus, or the like. The GPS performs position calculation processing for acquiring the three-dimensional coordinate values, which indicate the position of the position calculating device, and a time error on the basis of the information, such as the positions of a plurality of GPS satellites or a pseudo distance from each GPS satellite to the position calculating device.

Known examples of the position calculation processing include position calculation processing using a least squared (LS) method and position calculation processing using a Kalman filter (hereinafter, referred to as a "KF"). In addition, as an application technique of the position calculation processing using the KF, a position calculation processing using an interactive mixing model (hereinafter, referred to as "IMM") is known in which a plurality of KF models are prepared, position calculation processing is performed for each of the KF models, and these processing results are mixed to determine the final output position (for example, see Yaakov Bar-Shalom, X. Rong Li, Thiagalingam Kirubarajan, "Estimation with Applications to Tracking and Navigation", (U.S.A.), JOHN WILEY & SONS INC, 2001, p. 92-93, 453-457).

In the IMM, in order to meet various movement states of a position calculating device, it can be considered that the calculation is performed under the conditions in which a KF model corresponding to each assumed movement state is defined beforehand. For example, it is possible to assume a stopped state, a uniform-speed state, and an accelerated/decelerated state as the movement states of a position calculating device and to perform the position calculation processing based on the IMM using a fixed point KF model, a uniform-speed KF model, and a constant acceleration KF model.

In the IMM, the likelihood of the amount of external observations input to the KF model is calculated using a probability density function according to normal distribution (Gaussian distribution). In addition, using the calculated likelihood, a model probability used as the weighting when mixing the processing results of the KF models is calculated. In addition, the output position is determined by mixing the processing results of the KF models using the calculated model probability.

As the amount of external observations input to the KF model, for example, the information on a received frequency or phase of a positioning signal may be used. However, if the receiving environment of the positioning signal is not good, there is a decline in the accuracy of the received frequency or phase of the observed positioning signal. In this case, since the likelihood is not calculated appropriately, the model probability may be calculated incorrectly.

For example, the model probability of the fixed point KF model increases even though the position calculating device is moving. This may result in "position delay" in which the output position is temporally delayed from the actual position. On the contrary, the model probability of the constant acceleration KF model increases even though the position calculating device has stopped. This may result in "position jump" in which the output position significantly deviates from the actual position. These are causes of a lowering of the accuracy of position calculation.

SUMMARY

An advantage of some aspects of the invention is to improve the accuracy of position calculation using a plurality of KF models.

According to an aspect of the invention, there is provided a position calculating method including: executing position calculation processing using a plurality of Kalman filter processing, which is processing corresponding to each of a plurality of power spectral density groups classified by performing in advance frequency analysis on the movement acceleration of a movable body as an object of position calculation and which includes an error parameter set to a different value according to the power spectral density group and a parameter indicating that the movable body is in a uniform motion state, on the basis of a satellite signal from a positioning satellite; and determining the position of the movable body using a position calculated by each Kalman filter processing.

Furthermore, according to another aspect of the invention, there is provided a position calculating device including: a calculation section that executes position calculation processing using a plurality of Kalman filter processing, which is processing corresponding to each of a plurality of power spectral density groups classified by performing in advance frequency analysis on the movement acceleration of a movable body as an object of position calculation and which includes an error parameter set to a different value according to the power spectral density group and a parameter indicating that the movable body is in a uniform motion state, on the basis of a satellite signal from a positioning satellite; and a position calculating section that determines the position of the movable body using a position calculated by each Kalman filter processing.

According to the aspects of the invention, the position calculation processing is executed using a plurality of Kalman filter processing including an error parameter and a parameter indicating that the movable body is in a uniform motion state, on the basis of a satellite signal from a positioning satellite. The error parameter is set to a different value according to a plurality of power spectral density groups classified by performing in advance frequency analysis on the movement acceleration of the movable body. In addition, the position of the movable body is determined using the position calculated by each Kalman filter processing.

Although the details will be described later, the inventor of this application found out that the movement acceleration of the movable body exhibited features close to white noise as a result of having performed the running test on the movable body, which holds or has mounted the position calculating device therein, while changing various conditions. Therefore, as an embodiment of the invention, the position was calculated using a plurality of Kalman filter processing including a parameter indicating that the movable body was in a uniform motion state, and without using the Kalman filter processing including a parameter indicating that the movable body was in an acceleration state. As a result, it is possible to prevent a contradictory determination such as in the case where Kalman filter processing, which is performed on the assumption that the movable body is in a stopped state, is prioritized even though the movable body is moving or the case where Kalman filter processing, which is performed on the assumption that the movable body is in an accelerated state, is prioritized even though the movable body has stopped.

However, even if the movement acceleration exhibits features close to the white noise, the acceleration occurs by acceleration and deceleration of the movable body. For this reason, the movement acceleration cannot be neglected completely. Accordingly, the movement acceleration of the movable body is reflected in the value of an error parameter, which is a kind of a parameter in the Kalman filter processing, by regarding it as an error component. That is, the value of an error parameter of each of the plurality of Kalman filter processing is set according to a plurality of power spectral density groups classified by performing in advance frequency analysis on the movement acceleration. As a result, it is successful in improving the accuracy of position calculation.

Moreover, in the position calculating method described above, a position change allowance parameter indicating the tolerance of a position change may be included in the error parameter, and the values of the position change allowance parameter may be different in the Kalman filter processing.

In this case, the position of the movable body is determined by performing a plurality of Kalman filter processing in which the values of the position change allowance parameter indicating the tolerance of the position change included in the error parameter are different. A plurality of change allowance parameters, such as a parameter indicating the tolerance of a change in the position of a movable body or a parameter indicating the tolerance of a change in the moving speed, may be included in the error parameter. Particularly by performing a plurality of Kalman filter processing in which the values of the position change allowance parameter indicating the tolerance of a change in the position are different, the accuracy of position calculation is improved.

Moreover, in this case, the value of the position change allowance parameter may be a value that is set assuming movements with different acceleration.

Moreover, in this case, the Kalman filter processing may be two kinds of Kalman filter processing.

As a result of the experiments executed by the inventor of this application, it could be seen that the accuracy of position calculation was ensured to some degree when performing at least two kinds of Kalman filter processing including a parameter indicating that a movable body was in a uniform motion state. Accordingly, on the basis of this knowledge, the position is calculated by performing two kinds of Kalman filter processing including the parameter indicating that the movable body is in the uniform motion state.

BRIEF DESCRIPTION OF THE DRAWINGS

The invention will be described with reference to the accompanying drawings, wherein like numbers reference like elements.

FIG. 8 is a view showing a system noise matrix $Q_1$ for a first uniform-speed KF model.

FIG. 9 is a view showing a system noise matrix $Q_2$ for a second uniform-speed KF model.

FIG. 19 is a view showing an example of the data configuration of measurement history data.

FIG. 23 is a view showing a state transition matrix $\phi$ for uniform-speed KF models.

DESCRIPTION OF EXEMPLARY EMBODIMENTS

Hereinafter, an embodiment when the invention is applied to a mobile phone 1, which is a kind of electronic apparatus including a position calculating device, will be described with reference to the accompanying drawings. In addition, the mobile phone 1 moves by being carried by the user or moves in a state of being disposed in an automobile and the like. For this reason, in the present embodiment, a person who holds the mobile phone 1 or an object in which the mobile phone 1 is mounted will be described as a "movable body", and various directions detected by the mobile phone 1 will be described as directions of the movable body. Moreover, it is obvious that embodiments to which the invention can be applied are not limited to the embodiment to be described below.

1. Principles

First, position calculation processing using an interactive mixing model (hereinafter, appropriately referred to as "IMM"), which is one of the characteristic processing in the present embodiment, will be described.

Figure 1:
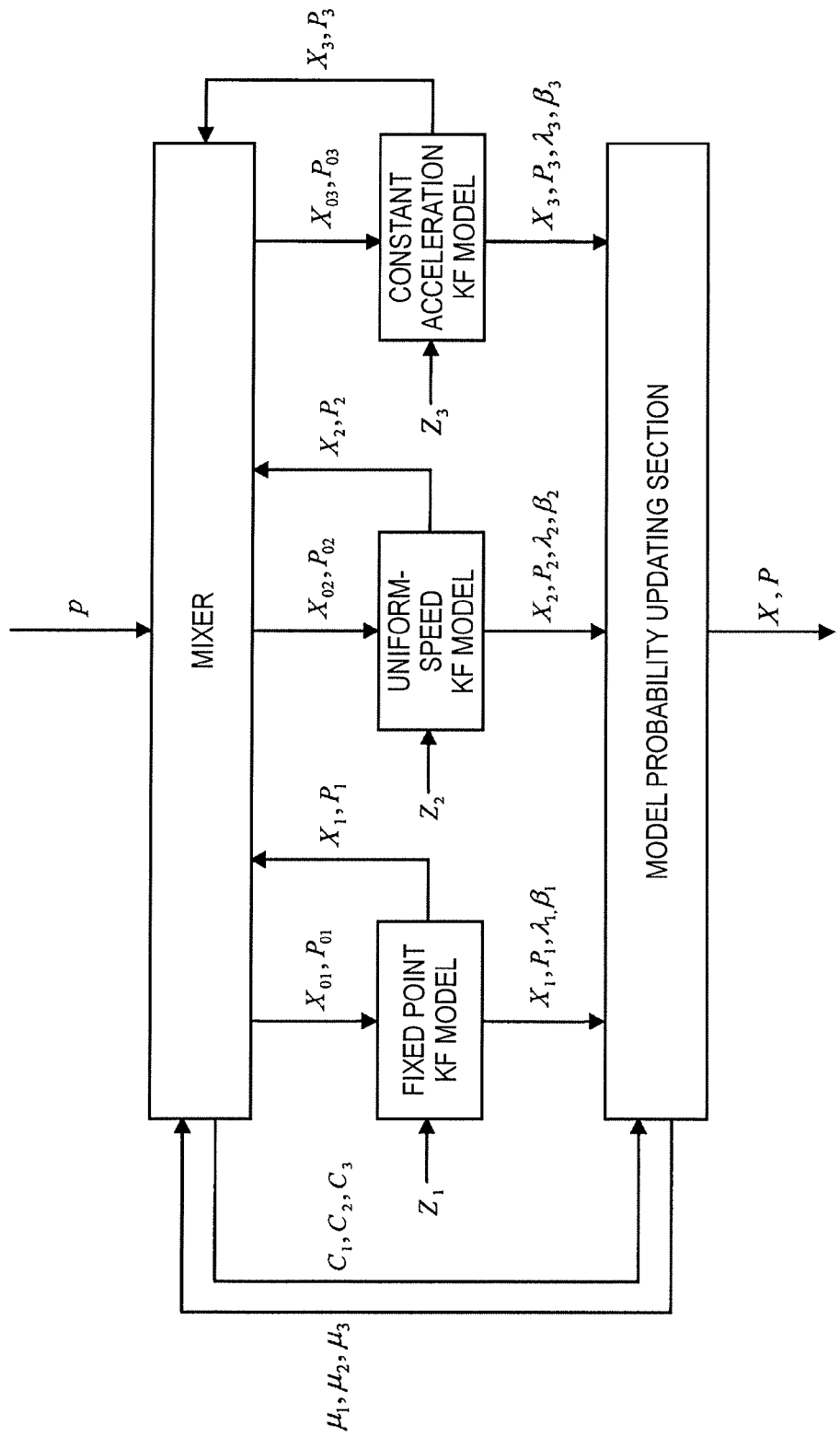
FIG. 1 is an explanatory view of an IMM in the case of three models.

FIG. 1 is a view explaining the concept of the IMM. Here, an explanation will be made assuming that the position calculation using the IMM is realized by operations in a plurality of processing circuit blocks, in order to make the explanation easily understood. However, the position calculation using the IMM may also be realized by a single processor, and the details will be described later using a flow chart.

The IMM is a model that determines a final output result by defining a plurality of Kalman filter models (hereinafter, referred to as "KF models") and mixing the processing results of the KF models by the weighting called a model probability μ.

Various models may be defined as KF models. For example, when a stopped state, a uniform-speed state, and an accelerated/decelerated state are assumed as three movement states of a movable body, three KF models including a "fixed point KF model" which is a KF model for the stopped state, a "uniform-speed KF model" which is a KF model for the uniform motion state, and a "constant acceleration KF model" which is a KF model for the accelerated/decelerated state are defined.

For each KF model, the amount of external observations is given. In the present embodiment, the observation value (hereinafter, referred to as a "measurement observation value") Z of the received frequency and code phase of a GPS satellite signal is given as the amount of external observations. In addition, the amount of external observations may be appropriately set and changed according to a system which applies the IMM.

In the IMM, a mixer calculates the initial values "$X_0$: $X_{01}$, $X_{02}$, $X_{03}$" and "$P_0$: $P_{01}$, $P_{02}$, $P_{03}$" in this calculation of state vector and error covariance of each KF model using the transition probability between models "p" indicating the transition probability between KF models, the model probability "μ: $μ_1$, $μ_2$, $μ_3$" of each KF model calculated and updated by a model probability updating section in the previous step, and the calculated value "X: $X_1$, $X_2$, $X_3$" of the state vector and the calculated value "P: $P_1$, $P_2$, $P_3$" of the error covariance calculated for each KF model. Then, the calculated result is output to the corresponding KF model.

The state vector X is a vector expressing the state of the mobile phone 1. For example, the state vector X may be expressed as a "11×1" matrix which has as components three-dimensional position (x, y, z), three-dimensional moving speed (u, v, w), three-dimensional acceleration ($a_x$, $a_y$, $a_z$), a clock bias b, and a clock drift d. In addition, the error covariance matrix P is a "11×11" matrix which expresses the covariance of errors of the components included in the state vector.

The difference among the three KF models of the "fixed point KF model", the "uniform-speed KF model", and the "constant acceleration KF model" is a difference of a state transition matrix φ which is a kind of a parameter of the Kalman filter. The state transition matrix φ is a "11×11" matrix which expresses the transition of the state vector X, and the arrangement of the rows and the columns corresponds to the arrangement of eleven-dimensional components of the state vector X. In the case of the "fixed point KF model", the calculation is performed using a state transition matrix $φ_s$ for fixed point KF models. In the case of the "uniform-speed KF model", the calculation is performed using a state transition matrix $φ_v$ for uniform-speed KF models. In the case of the "constant acceleration KF model", the calculation is performed using a state transition matrix $φ_A$ for constant acceleration KF models.

The mixer calculates a constant called a normalization constant "CN: $C_1$, $C_2$, $C_3$" using the transition probability between models p and the model probability μ, which has been calculated and updated by the model probability updating section in the previous step, and outputs the constant to the model probability updating section.

Each KF model calculates the current calculation values X and P of the state vector and error covariance matrix by performing an estimation operation and a correction operation similar to the known Kalman filter using the initial values $X_0$ and $P_0$ of the state vector and error covariance matrix input from the mixer and the measurement observation value "Z: $Z_1$, $Z_2$, $Z_3$", which is the amount of external observations, and outputs the calculation values X and P to the model probability updating section. In addition, each KF model calculates the values called the likelihood "λ: $λ_1$, $λ_2$, $λ_3$" and the weighting factor "β: $β_1$, $β_2$, $β_3$" and outputs the values to the model probability updating section.

The likelihood λ is an index value indicating the likelihood of the measurement observation value Z and may be calculated by using a probability density function (hereinafter, referred to as a "likelihood function") set beforehand. The likelihood λ will be described later using expressions. In addition, the weighting factor β is a value expressed as a coefficient portion of the likelihood function.

The model probability updating section newly calculates and updates the model probability μ using the normalization constant CN input from the mixer and the likelihood λ and weighting factor β input from the KF model. Then, the model probability updating section calculates the output value X of the state vector and the output value P of the error covariance by weighting each of the state vector and the error covariance input from the KF model with the calculated model probability μ and mixing them. The position expressed by the three-dimensional position (x, y, z) included in the output value X of the state vector becomes the final output position.

The IMM using the three kinds of KF models is advantageous in that it can meet various movement states of the movable body. However, for example, when the receiving environment of a GPS satellite signal is not good, there is a decline in the accuracy of the received frequency or code phase (measurement observation value) of the observed GPS satellite signal. If the accuracy of the measurement observation value falls, the likelihood λ, is not calculated appropriately. This becomes a cause of incorrect calculation of the model probability μ.

For example, the model probability $μ_1$ of the fixed point KF model increases even though the movable body is moving. This may result in "position delay" in which the output position is temporally delayed from the actual position. On the contrary, the model probability $μ_3$ of the constant acceleration KF model increases even though the movable body has stopped. This may result in "position ramp" in which the output position largely deviates from the actual position.

Figure 2:
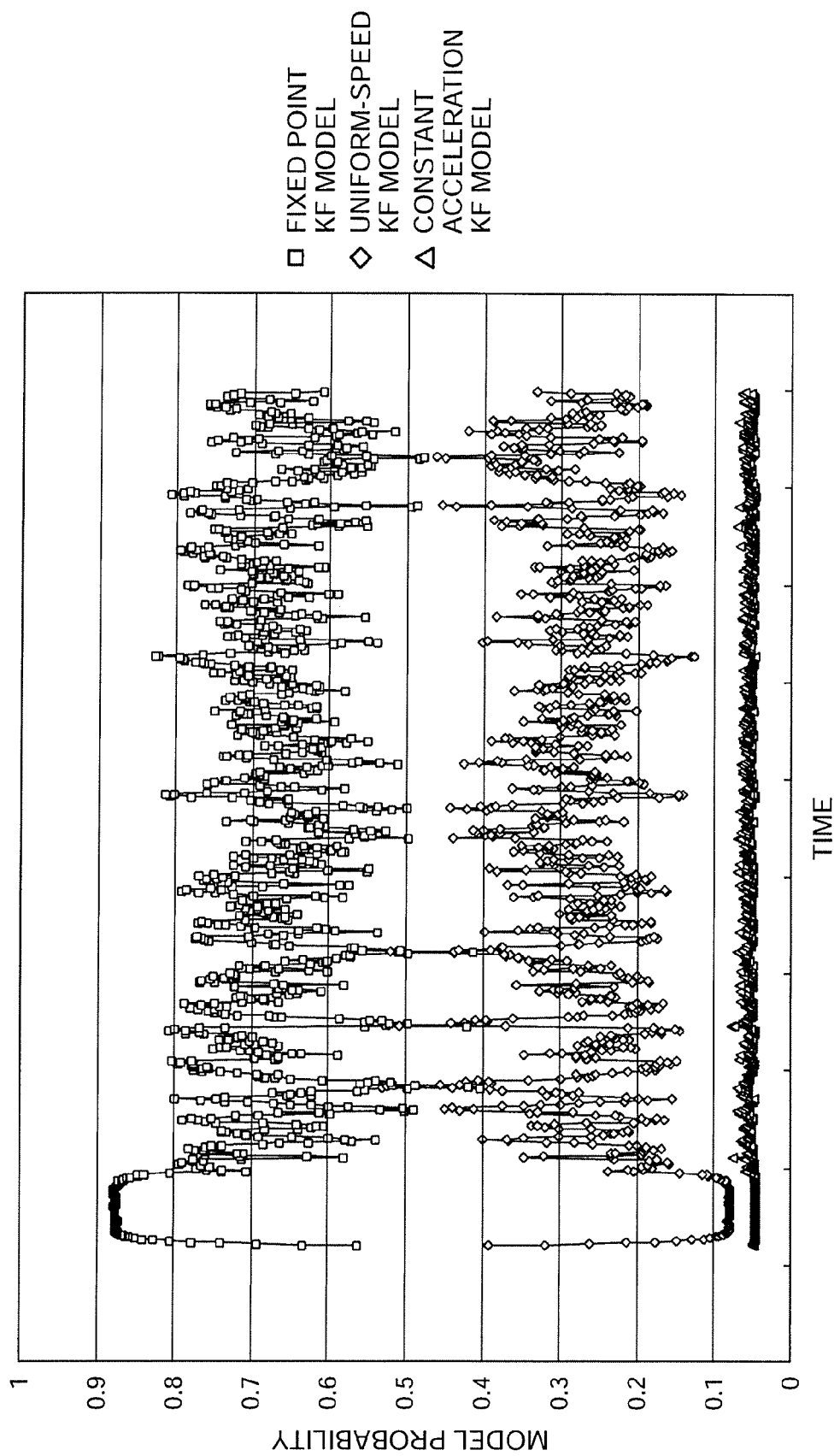
FIG. 2 is a graph showing an example of a temporal change of the model probability.

FIG. 2 is a graph obtained by actually calculating and plotting the model probability μ of each KF model when a movable body, in which a position calculating device that adopts an IMM using the above-described three kinds of KF models is mounted, is made to move at a uniform speed. First, the movable body was in the stopped state. Then, the movable body was accelerated up to 6 km/h for one minute and then was made to move at a uniform speed of 6 km/h. "Northeast direction" was set as the moving direction of the movable body.

In FIG. 2, the horizontal axis indicates time, and the vertical axis indicates the model probability μ. In addition, a quadrangular plot shows the model probability $μ_1$ of the fixed point KF model, a diamond plot shows the model probability $μ_2$ of the uniform-speed KF model, and a triangular plot shows the model probability $μ_3$ of the constant acceleration KF model. The model probability μ is a value within the range of [0, 1], and "$μ_1+μ_2+μ_3=1$".

Since the movable body moves at a uniform speed after acceleration, the model probability $\mu_2$ of the uniform-speed KF model ideally should increase. However, referring to FIG. 2, the model probability $\mu_1$ of the fixed point KF model becomes high on the whole. Accordingly, it can be seen that the model probability is not calculated correctly.

Figure 3:
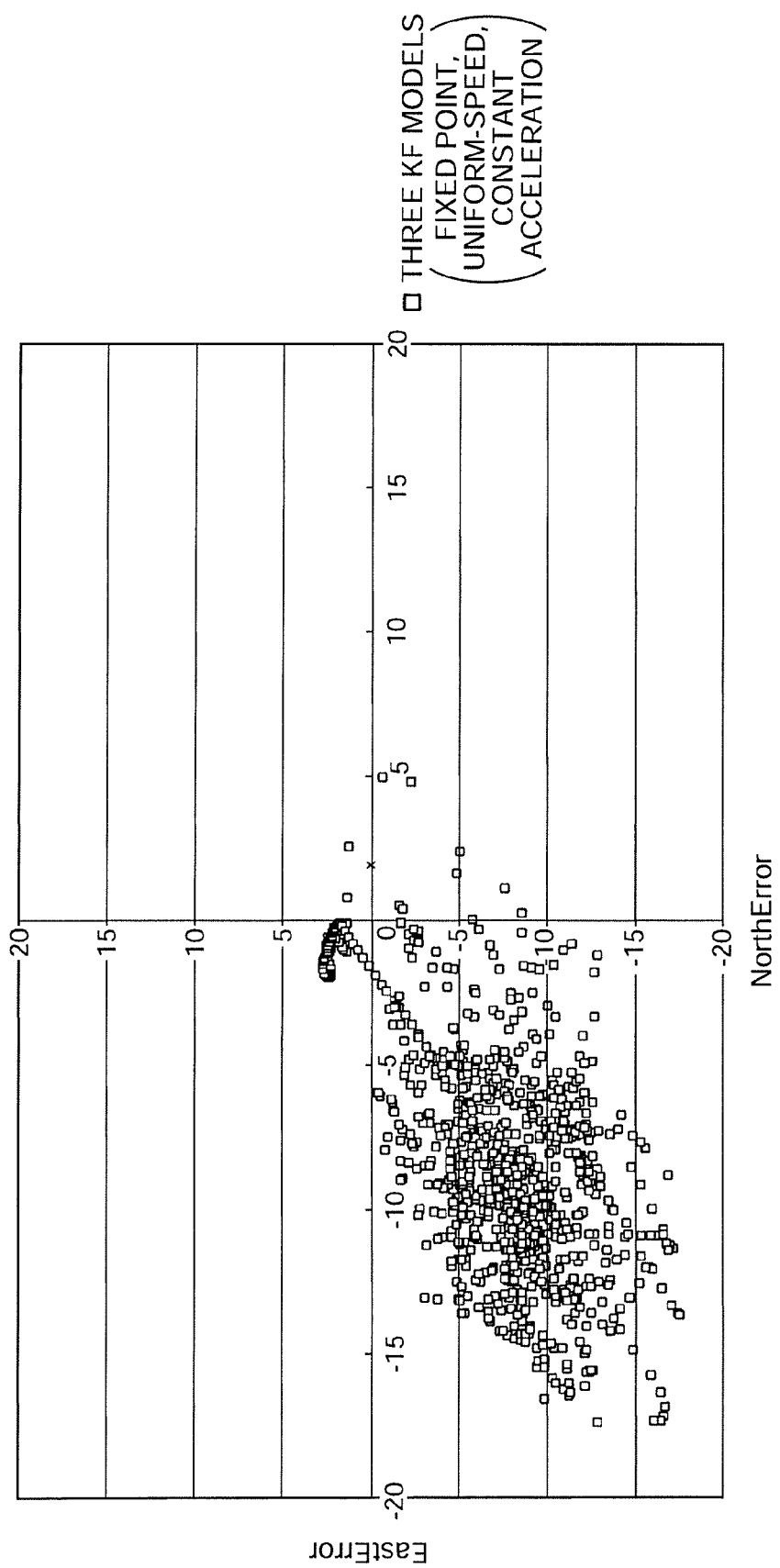
FIG. 3 is a graph showing an example of the output position error.

FIG. 3 is a graph showing the distribution of the output position error actually calculated in the experiment shown in FIG. 2. FIG. 3 shows a result obtained by calculating a positional error in the north direction and a positional error in the east direction and then plotting them in a two-dimensional manner. The closer the quadrangular plot is to the center of the graph means that the output position error is the smaller.

Referring to FIG. 3, it can be seen that the output position error deviates from the center of the graph and is distributed in the southwest portion. In the experiment shown in FIG. 2, since the northeast direction is set as the moving direction of the movable body, the distribution of the output position error in the southwest portion means that there is "position delay". This is because the weighting of the processing result of the fixed point KF model is high as the model probability $\mu_1$ of the fixed point KF model increases and accordingly, the filter acts to suppress fluctuation in the output position (to make the output position stand still if possible), as shown in FIG. 2.

Thus, the accuracy of position calculation falls due to selection of the opposite event to the actual movement state, like the case where the fixed point KF model is selected even though the movable body is moving actually, or on the contrary, the constant acceleration KF model is selected even though the movable body has actually stopped. For this reason, the inventor of this application considered removing the fixed point KF model and the constant acceleration KF model.

Figure 4:
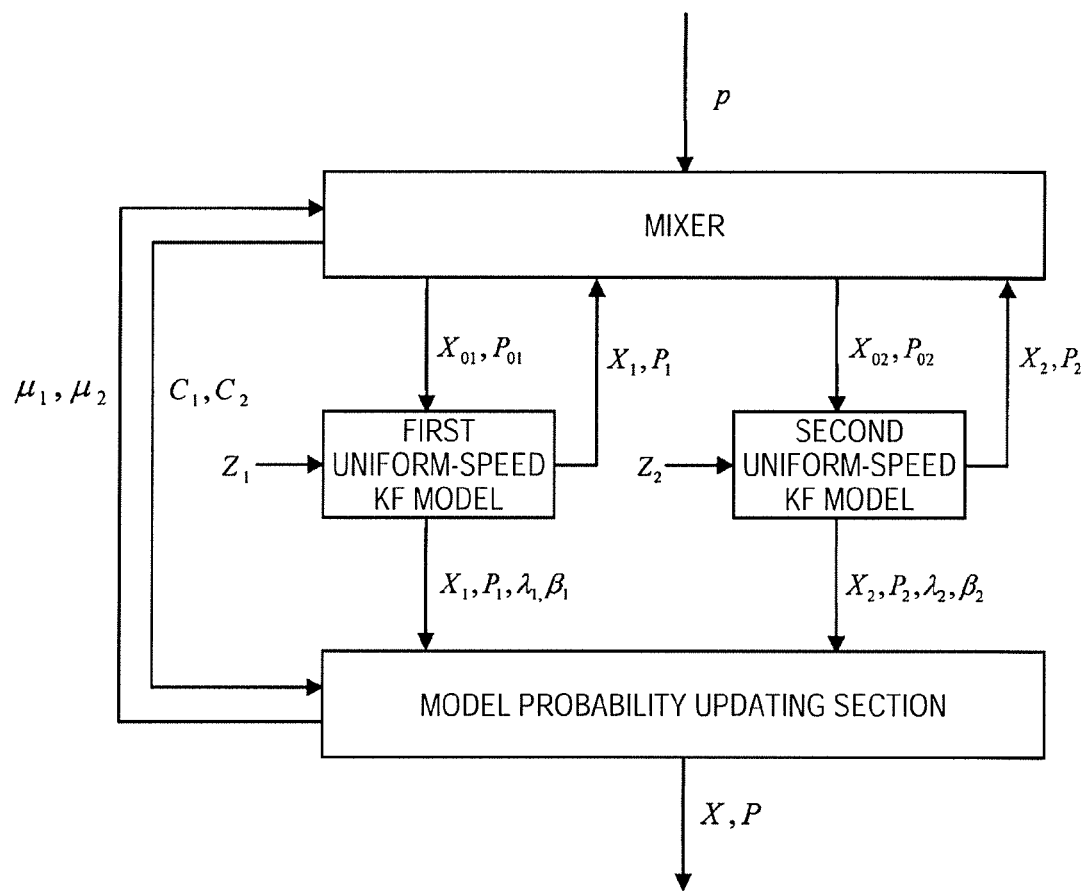
FIG. 4 is an explanatory view of an IMM in the case of two uniform-speed models.

FIG. 4 is a view explaining the concept of the IMM in the present embodiment. In the present embodiment, two kinds of uniform-speed KF models, a first uniform-speed KF model and a second uniform-speed KF model, are prepared and the position calculation using the IMM is performed. In this IMM, the calculation is performed using the "8×1" state vector X which has as components three-dimensional position (x, y, z) and three-dimensional moving speed (u, v, w) of the mobile phone 1, a clock bias b, and a clock drift d as shown in the following Expression (1). Since the constant acceleration KF model is not used, three-dimensional acceleration ($a_x$, $a_y$, $a_z$) is not included in the state vector X. This significantly reduces the amount of calculation.

$$X = \begin{pmatrix} x \\ y \\ z \\ u \\ v \\ w \\ b \\ d \end{pmatrix} \quad (1)$$

Since both the first and second uniform-speed KF models are uniform-speed KF models, the calculation is performed using a state transition matrix $\phi_v$, for uniform-speed KF models shown in FIG. 23. In the present embodiment, the calculation is performed using the "8×1" state vector X as shown in the Expression (1). Accordingly, the state transition matrix $\phi_v$ for uniform-speed KF models in this case becomes a "8×8" matrix, and the arrangement of the rows and the columns corresponds to the arrangement of eight-dimensional components of the state vector X.

The reason why two kinds of uniform-speed KF models are adopted will be described. The inventor of this application performed field tests in which a known GPS receiver capable of accurately calculating the position and the moving speed was held or mounted in movable bodies, such as automobiles, human beings, and electric cars, and the movable bodies were made to move freely. Running tests of the movable bodies under various kinds of environments were performed, such as a walking test, a running test on the mountain road, a running test in town, a running test in a highway, a running test in a multi-path environment, and a running test in the Bullet Train, and the positions and moving speeds of the movable bodies were calculated. Then, the movement accelerations of the movable bodies were calculated using the calculated positions and moving speeds (specifically, by differentiating a moving speed vector).

In addition, frequency analysis of the movement acceleration was performed using an autocorrelation technique. As a result, it could be seen that the movement acceleration exhibited features close to white noise. From this result, an embodiment was devised in which the position calculation was performed without using a constant acceleration KF model. However, even if the movement acceleration exhibits features close to white noise, the movement acceleration occurs by acceleration and deceleration of the movable body. For this reason, the movement acceleration cannot be neglected completely. Accordingly, an embodiment was devised in which the movement acceleration was regarded as a model error of a KF model, that is, as noise, and was reflected as "system noise" which was a kind of an error parameter in the KF.

Figure 5:
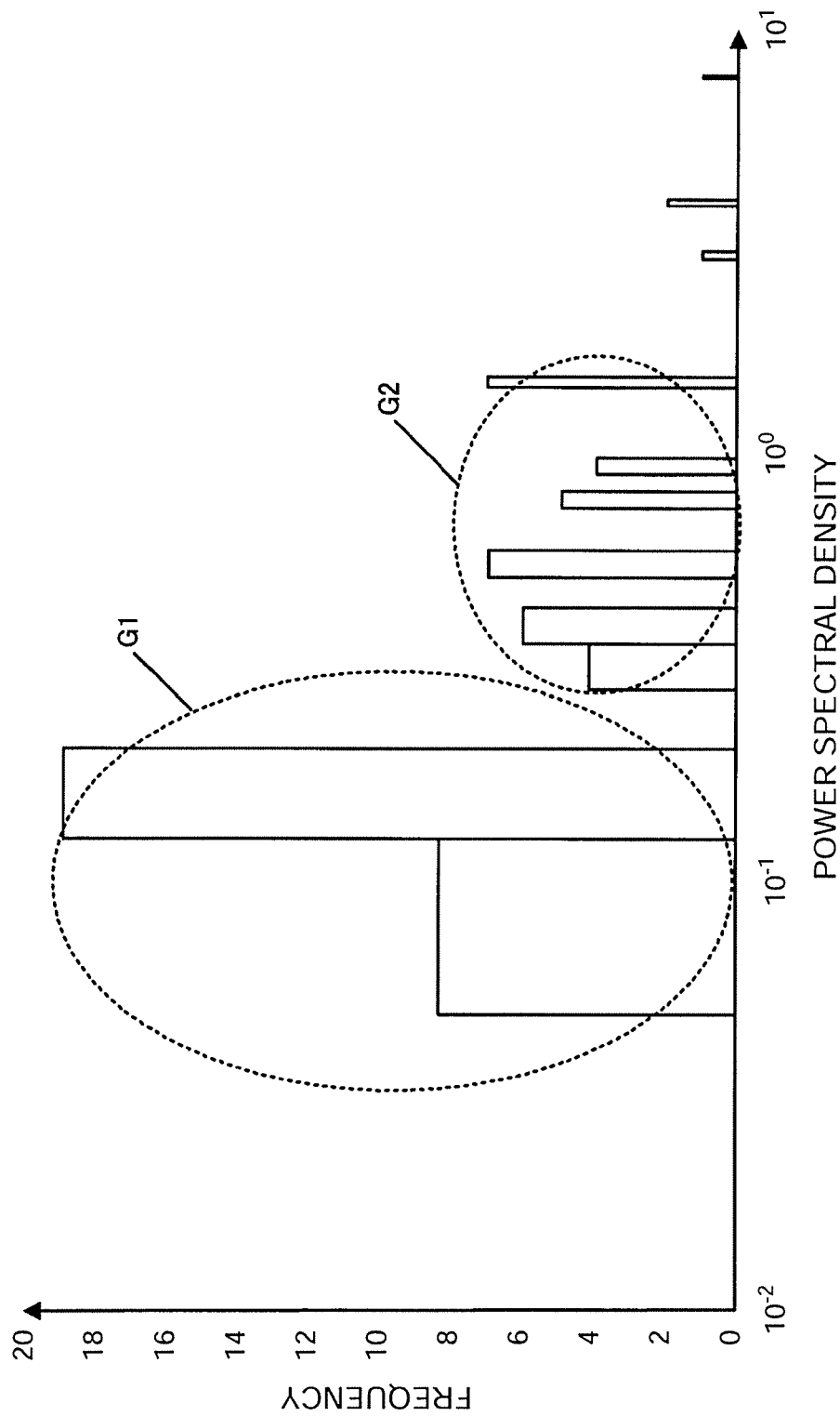
FIG. 5 is a histogram showing a result of frequency analysis of an acceleration component.

FIG. 5 shows a histogram in which the power of noise is analyzed. The horizontal axis indicates the power spectral density, and the vertical axis indicates the frequency of the power spectral density. Referring to FIG. 5, the power of noise may be largely classified into two groups including a group G1 with the power spectral density of an order of "$10^0$" and a group G2 with the power spectral density of an order of "$10^{-1}$". From this result, an embodiment was devised in which two kinds of uniform-speed KF models were prepared and the value of system noise in each uniform-speed KF model was determined on the basis of the power of noise in the groups G1 and G2.

Figure 6:
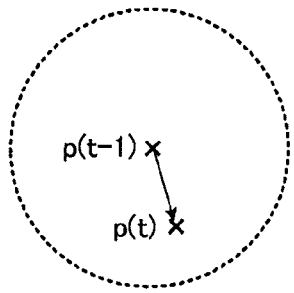
FIG. 6 is an explanatory view of system noise.
Figure 7:
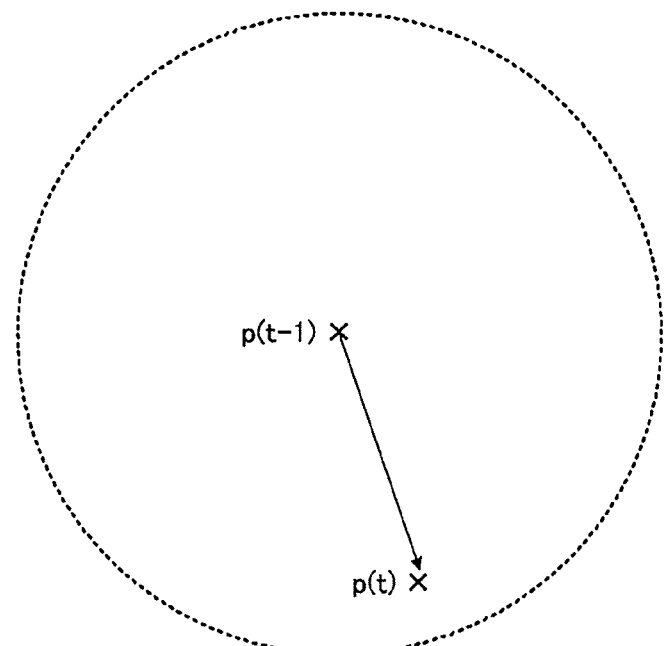
FIG. 7 is an explanatory view of system noise.

FIGS. 6 and 7 are views explaining the concept of system noise in the present embodiment. The uniform-speed KF model is a KF model on the assumption that the movable body moves at a uniform speed. However, since the movable body does not move at a completely uniform speed, movement acceleration occurs more or less. A parameter which determines how a change in the state (position or moving speed) of the movable body is to be allowed by regarding the acceleration as a model error of a KF model is the system noise in the present embodiment. As will be described later, the system noise is expressed in a matrix. Of the system noise, a parameter which determines the tolerance of the position change of the movable body is especially called a "position change allowance parameter".

Conceptually, assuming that the position of the movable body at time t−1 is p(t−1), the range of a circle having the position p(t−1) as the center may be considered to be a range where the position change is allowed (hereinafter, referred to as a "position change allowable range"). The radius of the position change allowable range is determined by the value of the position change allowance parameter. In the calculation using the KF, the filter acts so that the position p(t) at the next time t is included in this circle.

If the value of the position change allowance parameter is small, the position change allowable range becomes narrow. Accordingly, since an operation of the filter is dominant in calculation of the KF, fluctuation in the position of a movable body is suppressed. In this case, the tolerance of the position change is small. On the other hand, if the value of the position change allowance parameter is large, the position change allowable range becomes wide. Accordingly, since the operation of the filter is minor in calculation of the KF, a fluctuation in the position of the movable body becomes large. In this case, the tolerance of the position change is large. In addition, components other than the position may be included in the state vector X. The components other than the position may be considered in the same way.

FIG. 8 is a view showing a system noise matrix $Q_1$ for the first uniform-speed KF model corresponding to system noise for the first uniform-speed KF model, and FIG. 9 is a view showing a system noise matrix $Q_2$ for the second uniform-speed KF model corresponding to system noise for the second uniform-speed KF model.

In the present embodiment, since the state vector X is an eight-dimensional vector, it is necessary to consider system noise in an eight-dimension manner. Specifically, system noise is considered expressed as a "8×8" matrix corresponding to the eight-dimensional components of the state vector X. The arrangement of rows and columns corresponds to the arrangement of the eight-dimensional components of the state vector X. In the present embodiment, the system noise is also called a "system noise matrix" because the system noise is expressed in a matrix.

$Q_1$ and $Q_2$ are expressed in approximately the same matrix, but the values of "SP1" and "SP2" included in the matrix are different. Specifically, the diagonal component of a matrix portion MP1 corresponding to the three-dimensional position (x, y, z) is $Sp1 \cdot dt^3/3$ in $Q_1$ but $Sp2 \cdot dt^3/3$ in $Q_2$. In addition, the diagonal component of a matrix portion MP2 corresponding to the three-dimensional moving speed (u, v, w) is $Sp1 \cdot dt$ in $Q_1$ but $Sp2 \cdot dt$ in $Q_2$. In addition, the diagonal components of matrix portions MP3 and MP4 in which the position and the speed cross each other are $Sp1 \cdot dt^2/2$ in $Q_1$ but $Sp2 \cdot dt^2/2$ in $Q_2$. Here, "dt" is a time difference between the time at which the measurement observation value is acquired in this position calculation and the previous position calculation time.

In addition, the components corresponding to the clock bias b and the clock drift d are common in all system noise matrices and are BiasQ and DriftQ, respectively. The values of BiasQ and DriftQ are the constants determined on the basis of a characteristic of a clock in a position calculating device (GPS receiver).

SP1 and SP2 are the values calculated from the power spectral densities of the two groups G1 and G2 of the histogram shown in FIG. 5. Since the power spectral density of the group G1 is smaller than that of the group G2, SP1 is smaller than SP2. That is, it can be said that the second uniform-speed KF model is a model with a larger error than the first uniform-speed KF model.

2. Experimental Results

Figure 10:
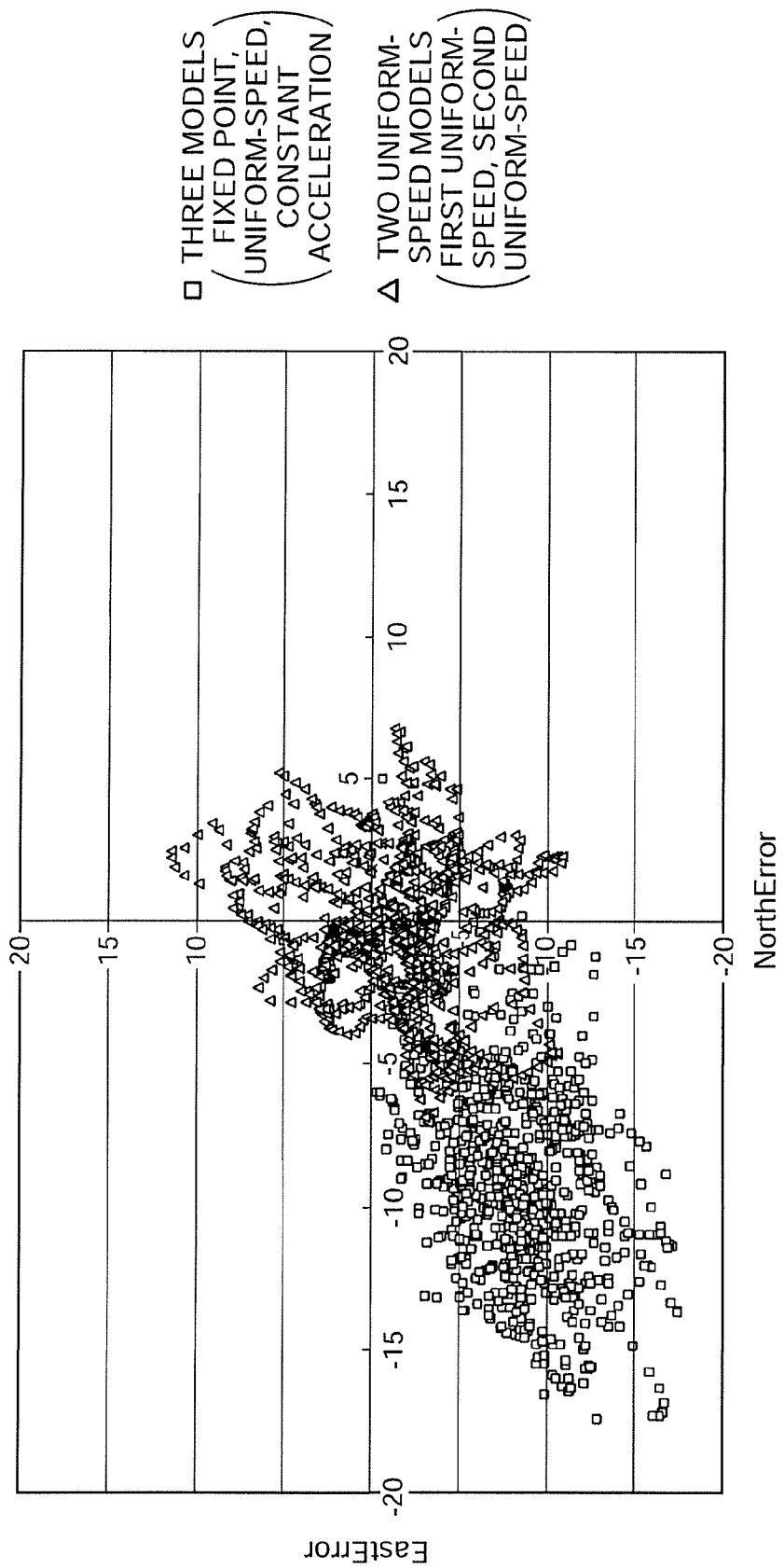
FIG. 10 is a graph showing an example of output position error when two uniform-speed models are used.

FIG. 10 is a view showing the distribution of the output position error when performing position calculation processing based on the IMM using two kinds of KF models (hereinafter, referred to as "two uniform-speed models") of first and second uniform-speed speeds. The conditions of the experiment are the same as those of the experiment in FIG. 3.

For comparison with the case where three kinds of KF models (hereinafter, referred to as "three models") of a fixed point, a uniform speed, and a constant acceleration are used, the experimental result of FIG. 3 is overlapped and displayed.

In FIG. 10, a quadrangular plot shows the output position error when the three models are used, and a triangular plot shows the output position error when the two uniform-speed models are used. Referring to FIG. 10, the output position error in the case of the two uniform-speed models concentrates on the middle portion of the graph. Accordingly, it can be seen that the output position error is small compared with that in the case of three models.

Figure 11:
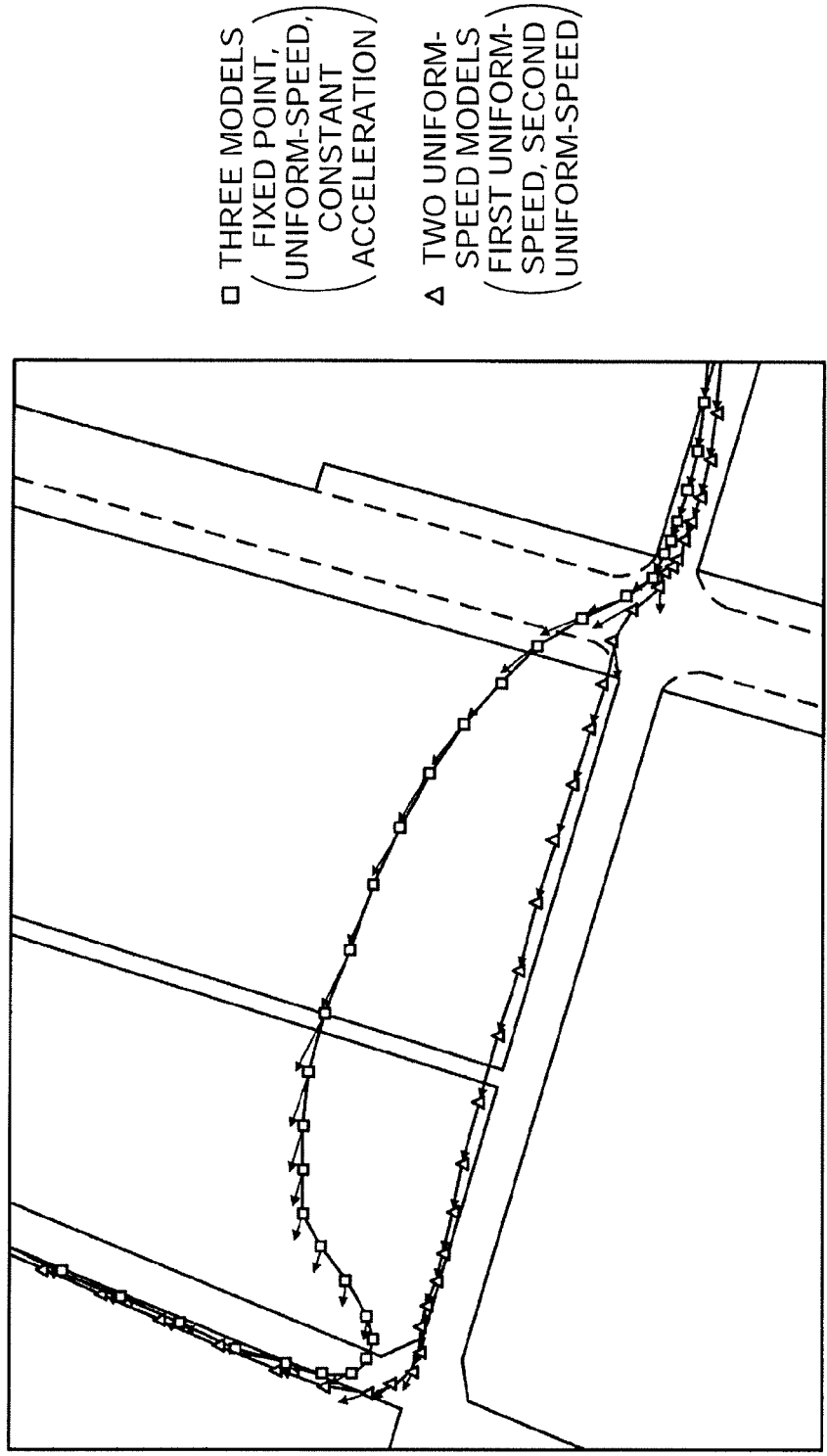
FIG. 11 is a graph showing the locus of the output position when two uniform-speed models are used.

FIG. 11 is a view showing an example of an experimental result in which the output position obtained by the position calculation processing based on the IMM is plotted. In this experiment, an automobile with the mobile phone 1 mounted therein was made to move at a uniform speed on the road from a lower right portion toward an upper left portion in FIG. 11. In FIG. 11, a quadrangular plot shows the output position when the three models are used, and a triangular plot shows the output position when the two uniform-speed models are used. In addition, the arrow displayed so as to overlap the plot is a moving speed vector.

From this result, it can be seen that the locus of the output position does not follow the road but is largely curved in the case of the three models. However, in the case of the two uniform-speed models, it can be seen that the locus of the output position is straight along the road and accordingly, the locus that the automobile traveled is almost correctly reproduced.

Figure 12:
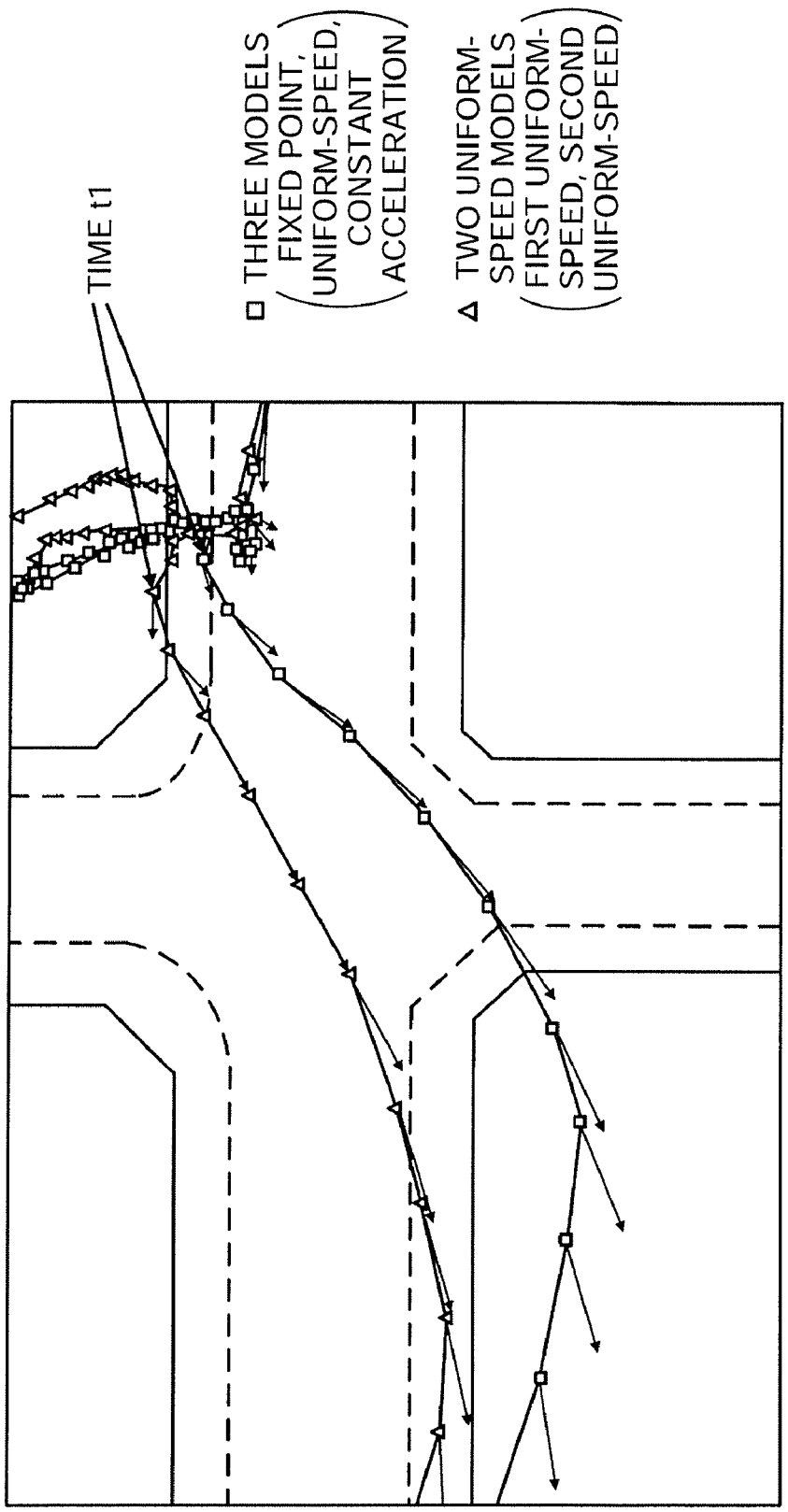
FIG. 12 is a graph showing the locus of the output position when two uniform-speed models are used.

FIG. 12 is a view showing an example of another experimental result in which the output position is plotted. In this experiment, an automobile with the mobile phone 1 mounted therein was stopped at the upper right portion in FIG. 12 for a predetermined time, accelerated toward the left direction, and then moved at a uniform speed. In FIG. 12, a quadrangular plot shows the output position when the three models are used, and a triangular plot shows the output position when the two uniform-speed models are used. In addition, the arrow displayed so as to overlap the plot is a moving speed vector.

Also from this result, it can be seen that in the case of the three models, the locus of the output position deviates from the road and fluctuates largely. In the case of the two uniform-speed models, however, the fluctuation is small compared with that in the case of the three models, and the locus of the output position follows the road.

Figure 13:
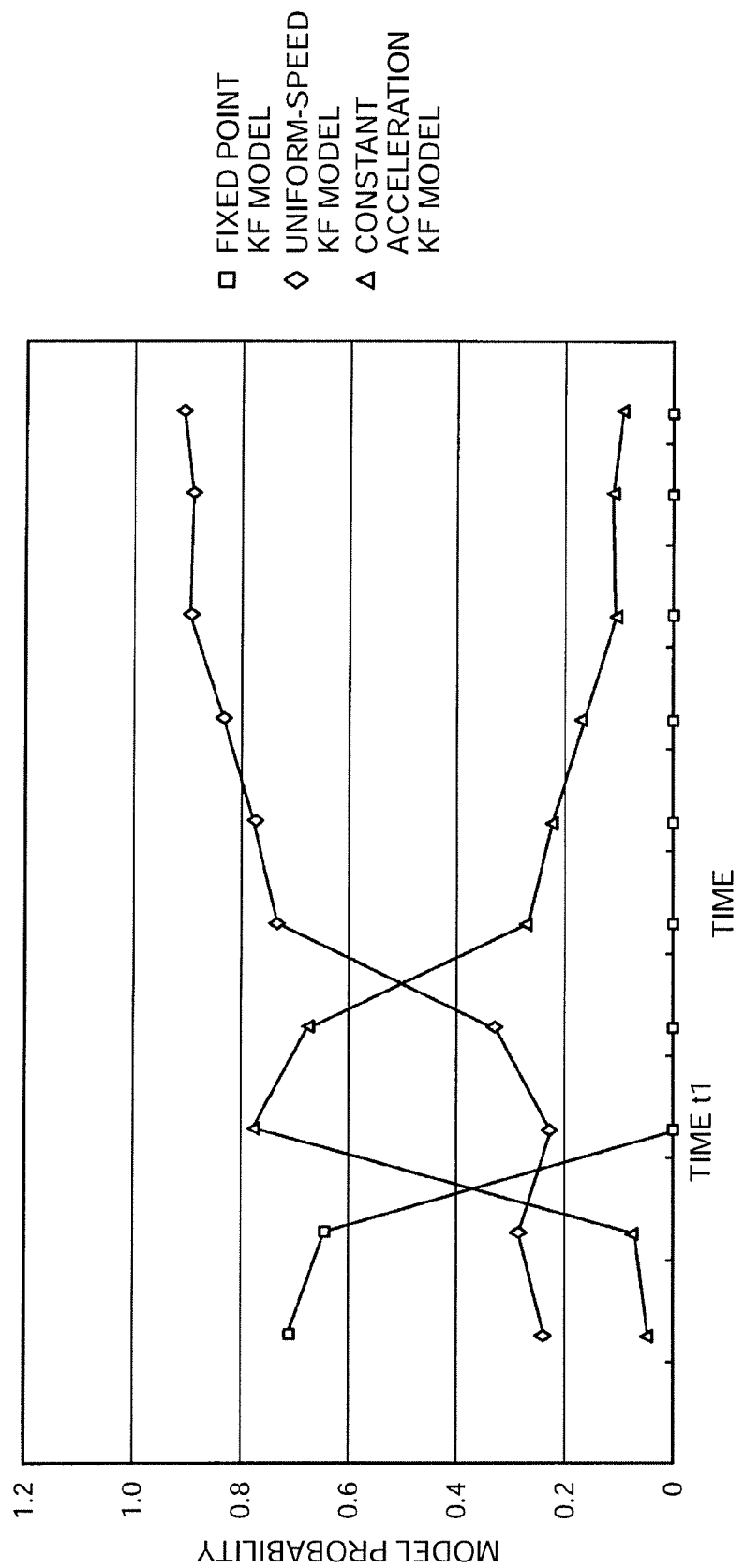
FIG. 13 is a graph showing an example of a temporal change in the model probability when three models are used.

FIG. 13 is a graph showing a temporal change in the model probability of each KF model in the case of the three models in the experimental result of FIG. 12. In FIG. 13, the horizontal axis indicates time, and the vertical axis indicates model probability $\mu$. In addition, a quadrangular plot shows the model probability of the fixed point KF model, a diamond plot shows the model probability of the uniform-speed KF model, and a triangular plot shows the model probability of the constant acceleration KF model.

Figure 14:
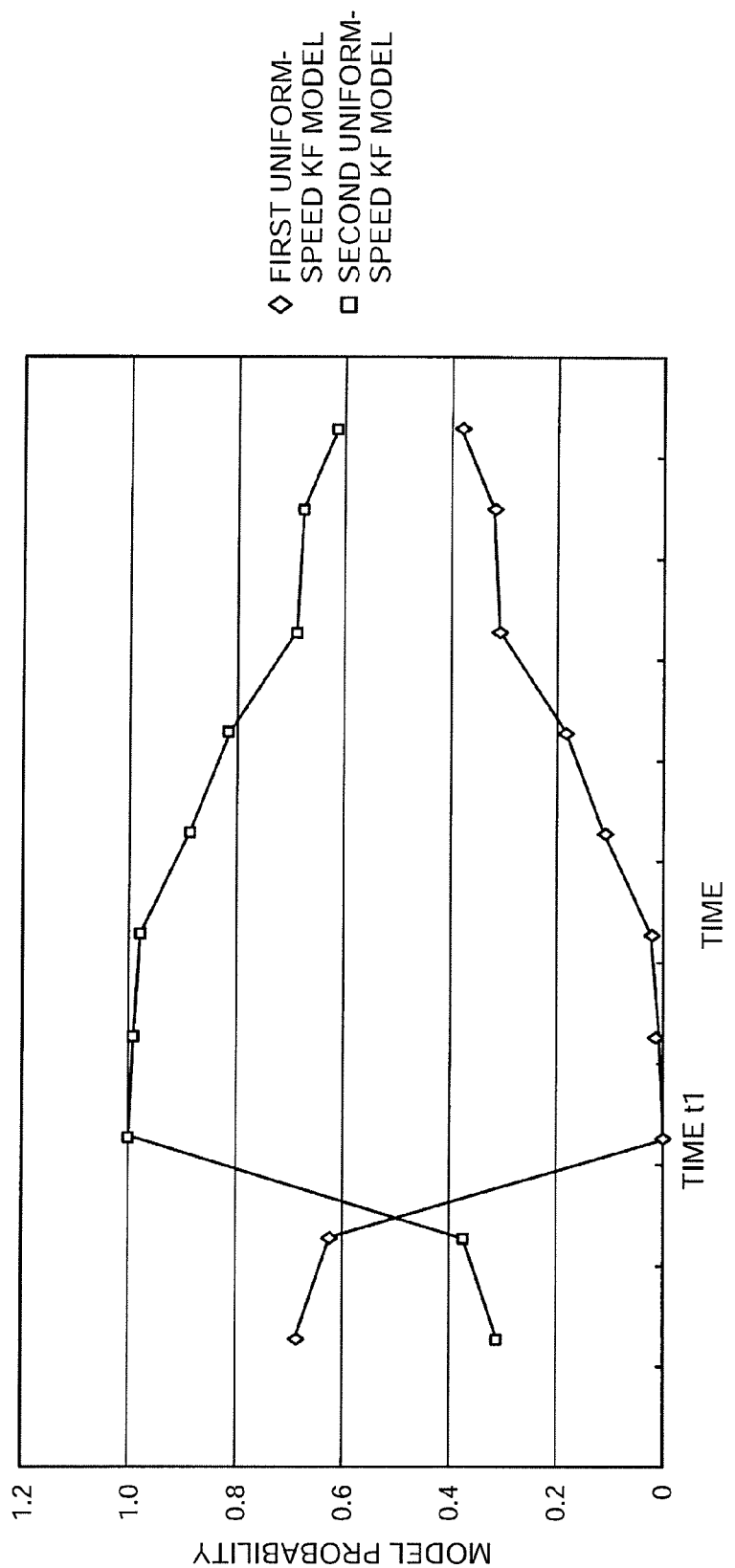
FIG. 14 is a graph showing an example of a temporal change in the model probability when two uniform-speed models are used.

In addition, FIG. 14 is a graph showing temporal change in the model probability of each uniform-speed KF model in the case of the two uniform-speed models in the experimental result of FIG. 12. In FIG. 14, the horizontal axis indicates time, and the vertical axis indicates model probability. In addition, a diamond plot shows the model probability of the first uniform-speed KF model, and a quadrangular plot shows the model probability of the second uniform-speed KF model.

Referring to FIGS. 13 and 14, it can be seen that at time t1 at which an automobile is in the acceleration state, the model probability of the constant acceleration KF model is high in the case of the three models and the model probability of the second uniform-speed KF model is high in the case of the two uniform-speed models. As described above, the second uniform-speed KF model is a model in which there is a large error (noise of an acceleration component). However, referring to FIG. 12, at time t1, fluctuation in the output position in the case of the two uniform-speed models is smaller than that in the case of the three models. This indicates that even if a uniform-speed KF model with a large error is selected, the output position is correctly calculated compared with the case of the three models.

3. Functional Configuration

Figure 15:
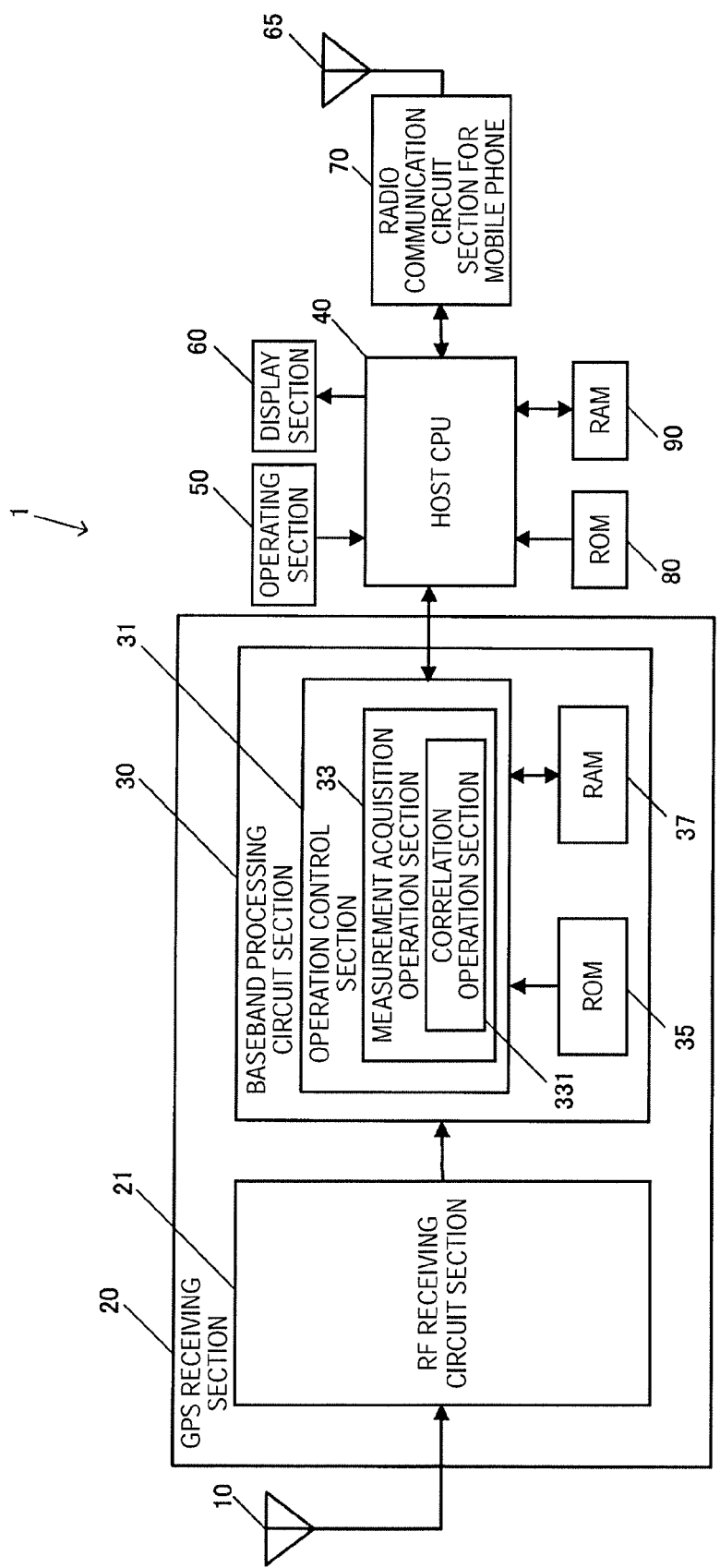
FIG. 15 is a block diagram showing an example of the functional configuration of a mobile phone.

FIG. 15 is a block diagram showing the functional configuration of the mobile phone 1. The mobile phone 1 is configured to include a GPS antenna 10, a GPS receiving section 20, a host CPU (central processing unit) 40, an operating section 50, a display section 60, a mobile phone antenna 65, a radio communication circuit section 70 for a mobile phone, a ROM (read only memory) 80, and a RAM (random access memory) 90.

The GPS antenna 10 is an antenna that receives an RF (radio frequency) signal including a GPS satellite signal transmitted from a GPS satellite, and outputs the received signal to the GPS receiving section 20. In addition, the GPS satellite signal is a communication signal with a frequency of 1.57542 [GHz] that is modulated by the direct spread spectrum method using a PRN (pseudo random noise) code which is a kind of different spread code for every satellite. The PRN code is a pseudo random noise code which has a code length of 1023 chips as 1 PN frame and has a repetition period of 1 ms.

The GPS receiving section 20 is a position calculation circuit which measures the position of the mobile phone 1 on the basis of a signal output from the GPS antenna 10 and is also a functional block equivalent to a so-called GPS receiver. The GPS receiving section 20 is configured to include an RF (radio frequency) receiving circuit section 21 and a baseband processing circuit section 30. In addition, the RF receiving circuit section 21 and the baseband processing circuit section 30 may be manufactured as separate LSIs (large scale integration) or may be manufactured as one chip.

The RF receiving circuit section 21 is a circuit block for RF signal processing and generates an oscillation signal for RF signal multiplication by dividing or multiplying a predetermined oscillation signal. Then, the RF signal is down-converted into a signal (hereinafter, referred to as an "IF (intermediate frequency) signal") with an intermediate frequency by multiplying the RF signal output from the GPS antenna 10 by the generated oscillation signal, and the IF signal is amplified. Then, the IF signal is converted into a digital signal by an A/D converter and is then output to the baseband processing circuit section 30.

The baseband processing circuit section 30 is a circuit section that captures and extracts a GPS satellite signal by performing correlation processing and the like on the IF signal output from the RF receiving circuit section 21 and that acquires a navigation message, time information, and the like by decoding the data. The baseband processing circuit section 30 is configured to include an operation control section 31, a ROM 35, and a RAM 37. In addition, the operation control section 31 is configured to include a measurement acquisition operation section 33.

The measurement acquisition operation section 33 is a circuit section that captures a GPS satellite signal from the received signal (IF signal), which is output from the RF receiving circuit section 21, and is configured to include a correlation operation section 331. The measurement acquisition operation section 33 acquires the information, such as the reception frequency or code phase of the captured GPS satellite signal, and outputs the information to the host CPU 40 as the measurement observation value.

The correlation operation section 331 captures the GPS satellite signal by performing the correlation processing for calculating and integrating the correlation between a PRN code and a replica code included in the received signal, for example, using the FFT operation. The replica code is a simulated signal of a PRN code which is generated in a pseudo manner and is included in a GPS satellite signal to be captured.

If a GPS satellite signal to be captured is correct, a PRN code and a replica code included in the GPS satellite signal will match each other (capture success). If it is wrong, the PRN code and the replica code included in the GPS satellite signal will not match (capture failure). Accordingly, it can be determined whether or not capturing of a GPS satellite signal has succeeded by determining the peak of the calculated correlation value. Thus, the GPS satellite signal can be captured by performing a correlation operation with the same received signal while sequentially changing the replica code.

In addition, the correlation operation section 331 performs the above-described correlation processing while changing the frequency and phase of the generated signal of the replica code. When the frequency of the generated signal of the replica code and the frequency of the received signal match each other and the phase of the PRN code and the phase of the replica code match each other, the correlation value is at a maximum.

More specifically, the range of predetermined frequency and phase corresponding to a GPS satellite signal to be captured is set as a search range. Then, a correlation operation in the phase direction for detecting the starting position (code phase) of a PRN code and a correlation operation in the frequency direction for detecting the frequency are performed within the search range. The search range related to the frequency is set within a predetermined frequency sweep range having 1.57542 [GHz], which is a carrier frequency of the GPS satellite signal, as a center frequency, and the search range related to the phase is set within a code phase range of 1023 chips which are the chip length of the PRN code.

The host CPU 40 is a processor which performs overall control of the sections of the mobile phone 1 according to various programs, such as a system program, stored in the ROM 80. In addition, the host CPU 40 determines the output position displayed on the display section 60 by measuring the position of the mobile phone 1 by performing the position calculation processing using the IMM, generates a navigation screen on which the output position is plotted, and displays the navigation screen on the display section 60.

The operating section 50 is an input device configured to include a touch panel or a button switch, for example, and outputs a signal corresponding to a pressed key or button to the host CPU 40. By the operation of the operating section 50, various kinds of instruction input are performed, such as input on the destination or display request of the navigation screen.

The display section 60 is a display device formed by using an LCD (liquid crystal display), for example, and performs various kinds of display on the basis of a display signal input from the host CPU 40. A navigation screen, time information, and the like are displayed on the display section 60.

The mobile phone antenna 65 is an antenna used to perform transmission and reception of a radio signal for mobile phones between the mobile phone 1 and a radio base station provided by a communication service provider of the mobile phone 1.

The radio communication circuit section 70 for a mobile phone is a communication circuit section of a mobile phone configured to include an RF conversion circuit, a baseband processing circuit, and the like and realizes transmission and reception of a call or mail, for example, by performing modulation, demodulation, and the like of the radio signal for mobile phones.

The ROM 80 is a read-only nonvolatile storage device and stores a system program which is used when the host CPU 40 controls the mobile phone 1, various programs or data used to realize a navigation function, and the like.

The RAM 90 is a readable and writable volatile storage device and forms the work area in which the system program executed by the host CPU 40, various processing programs, data being processed in various kinds of processing, a processing result and the like are temporarily stored.

4. Data Configuration

Figure 16:
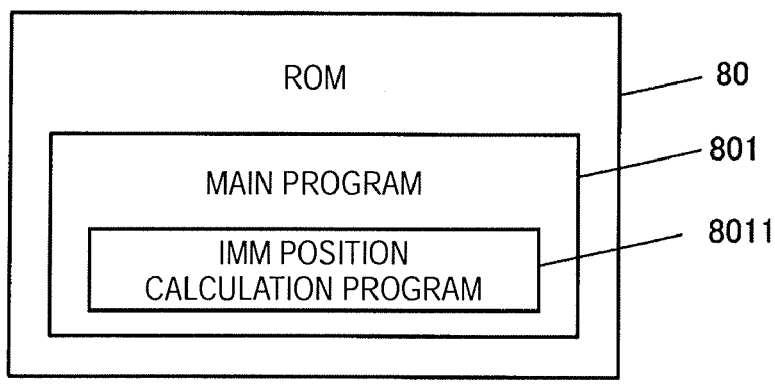
FIG. 16 is a view showing an example of the data stored in a ROM.

FIG. 16 is a view showing an example of data stored in the ROM 80. A main program 801 which is read by the host CPU 40 and is executed as main processing (refer to FIG. 20) is stored in the ROM 80. In addition, an IMM position calculation program 8011 executed as IMM position calculation processing (refer to FIGS. 21 and 22) is included as a subroutine in the main program 801.

The main processing includes not only the processing that the host CPU 40 performs for transmission and reception of a call or mail, which is an original function of the mobile phone 1, but also processing that the host CPU 40 performs in order to calculate the position of the mobile phone 1. Details of the main processing will be described later using a flow chart.

The IMM position calculation processing is processing when the host CPU 40 determines the output position of the mobile phone 1 by performing the position calculation processing using the IMM, generates a navigation screen on which the output position is plotted, and displays the navigation screen on the display section 60. Details of the IMM position calculation processing will also be described later using a flow chart.

Figure 17:
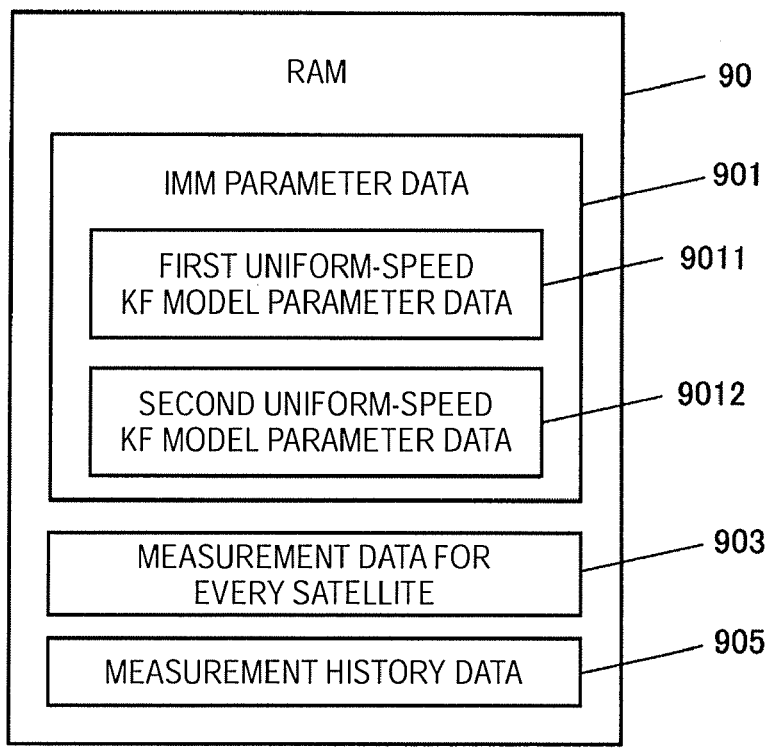
FIG. 17 is a view showing an example of the data stored in a RAM.

FIG. 17 is a view showing an example of data stored in the RAM 90. IMM parameter data 901, measurement data 903 for every satellite, and measurement history data 905 are stored in the RAM 90.

The IMM parameter data 901 is data in which a parameter value in the IMM is stored. First uniform-speed KF model parameter data 9011 and second uniform-speed KF model parameter data 9012 are included in the IMM parameter data 901. The values of various parameters, such as a state transition matrix $\phi$, a system noise matrix Q, and an observation error covariance matrix R, are included as the KF model parameters.

Figure 18:
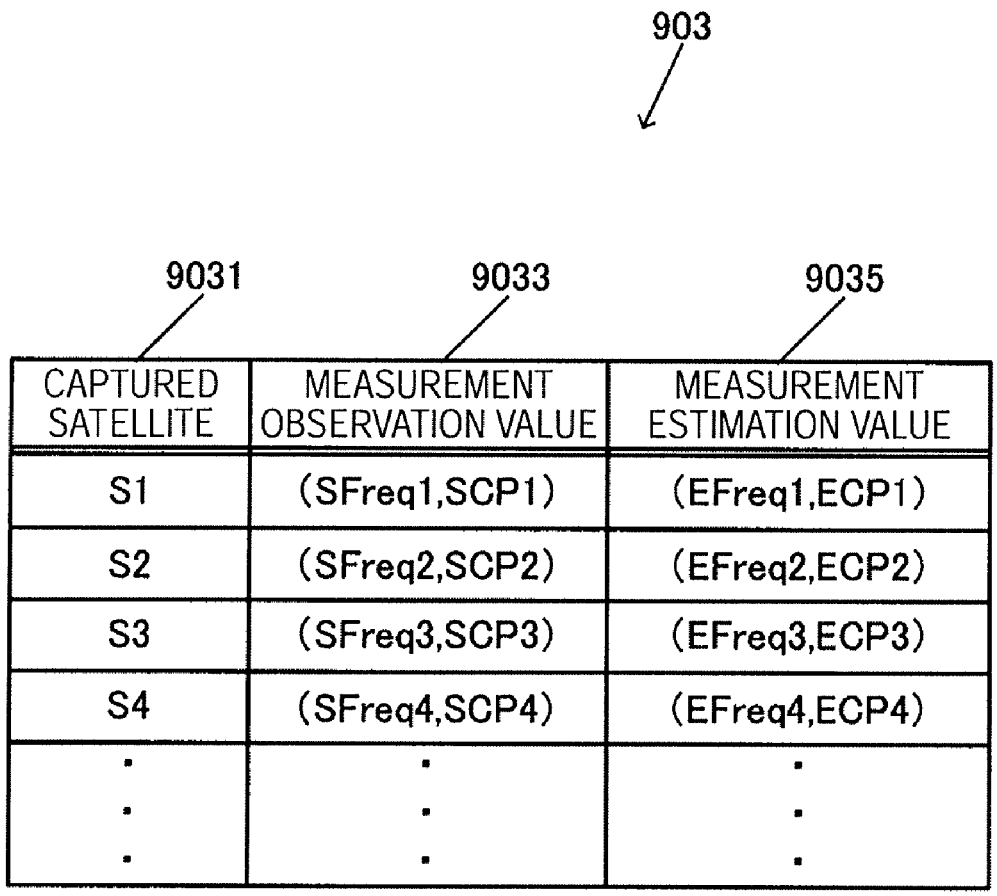
FIG. 18 is a view showing an example of the data configuration of measurement data for every satellite.

FIG. 18 is a view showing an example of the data configuration of the measurement data 903 for every satellite. The measurement data 903 for every satellite is data regarding the measurement observation value acquired by the measurement acquisition operation section 33. A captured satellite 9031, a measurement observation value 9033 which is a received frequency and a code phase of a GPS satellite signal received from the corresponding captured satellite, and a measurement estimation value 9035 which is a received frequency and a code phase of a GPS satellite signal that were estimated are stored in the measurement data 903 for every satellite so as to correspond with each other. The measurement estimation value 9035 may be calculated by multiplying the estimated value $X^-$ of a state vector by a predetermined observation matrix H.

For example, for the measurement observation value 9033 regarding a captured satellite S1, the received frequency is SFreq1 and the code phase is SCP1. In addition, for the measurement estimation value 9035 regarding the captured satellite S1, the received frequency is EFreq1 and the code phase is ECP1.

FIG. 19 is a view showing an example of the data configuration of the measurement history data 905. The measurement history data 905 is data regarding the output value of a state vector calculated by the IMM position calculation processing. A position calculation time 9051, a position vector 9053, a moving speed vector 9055, a clock bias 9057, and a clock drift 9059 are stored in the measurement history data 905 so as to correspond with each other.

5. Flow of Processing

Figure 20:
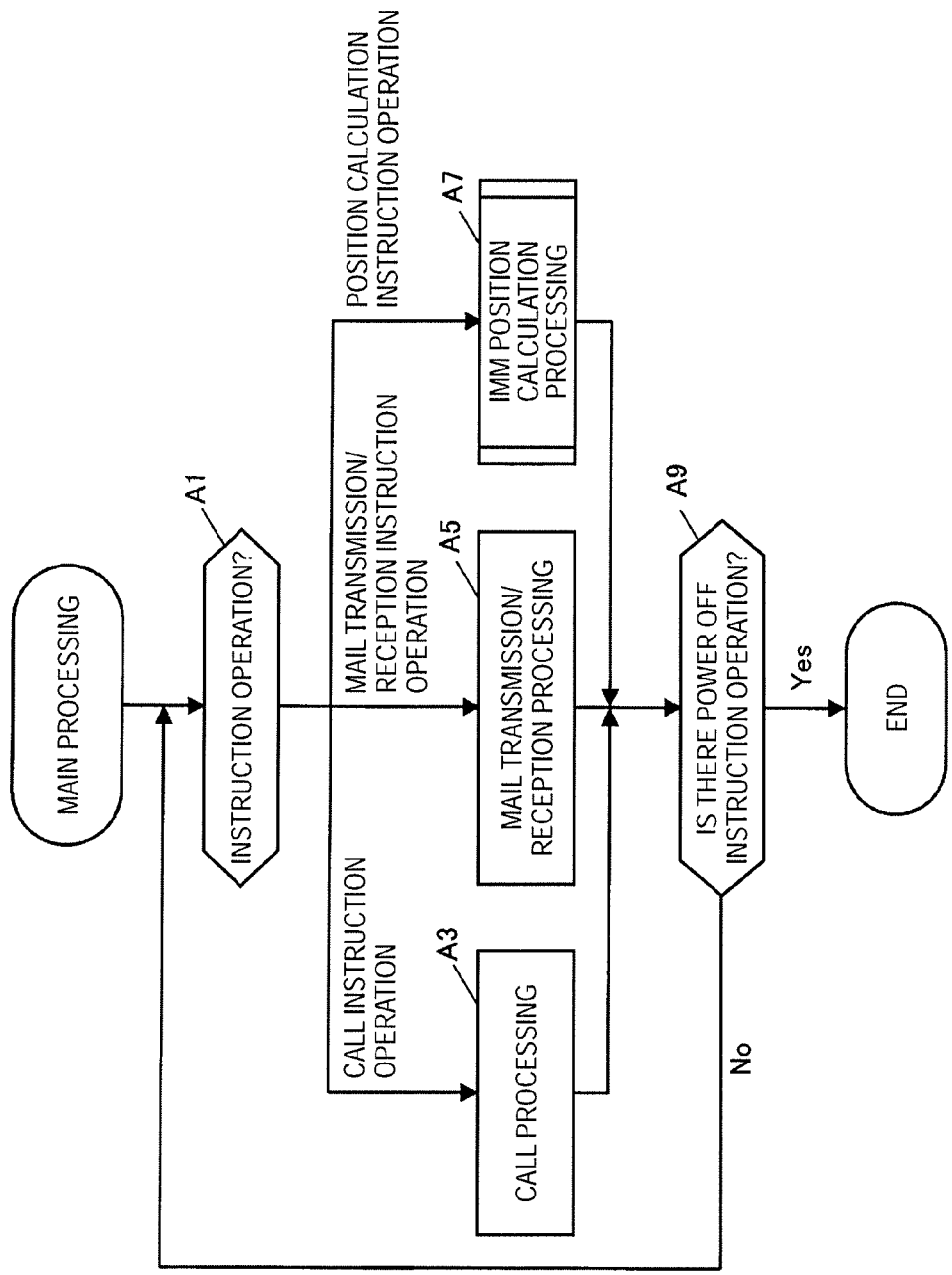
FIG. 20 is a flow chart showing the flow of main processing.

FIG. 20 is a flow chart showing the flow of main processing executed in the mobile phone 1 when the main program 801 stored in the ROM 80 is executed after being read by the host CPU 40.

The main processing is processing which starts when the host CPU 40 detects that the user has performed a power supply operation through the operating section 50. Moreover, although not particularly described, it is assumed that an RF signal is received through the GPS antenna 10 or down-converted to an IF signal by the RF receiving circuit section 21 and the IF signal is output to the baseband processing circuit section 30 as necessary while the following main processing is being executed. In addition, it is assumed that the received frequency and code phase of a GPS satellite signal are calculated by the measurement acquisition operation section 33 as necessary.

First, the host CPU 40 determines an instruction operation performed through the operating section 50 (step A1). When the instruction operation is determined to be a call instruction operation (step A1; call instruction operation), call processing is performed (step A3). Specifically, the host CPU 40 prompts the radio communication circuit section 70 for a mobile phone to perform base station communication with a radio base station, so that a call between the mobile phone 1 and another apparatus is realized.

In addition, when it is determined that the instruction operation in step A1 is a mail transmission/reception instruction operation (step A1; mail transmission/reception instruction operation), the host CPU 40 performs mail transmission/reception processing (step A5). Specifically, the host CPU 40 prompts the radio communication circuit section 70 for a mobile phone to perform base station communication, so that transmission and reception of a mail between the mobile phone 1 and another apparatus is realized.

In addition, when the instruction operation is determined to be a position calculation instruction operation in step A1 (step A1; position calculation instruction operation), the host CPU 40 performs the IMM position calculation processing by reading the IMM position calculation program 8011 from the ROM 80 and executes it (step A7).

Figure 21:
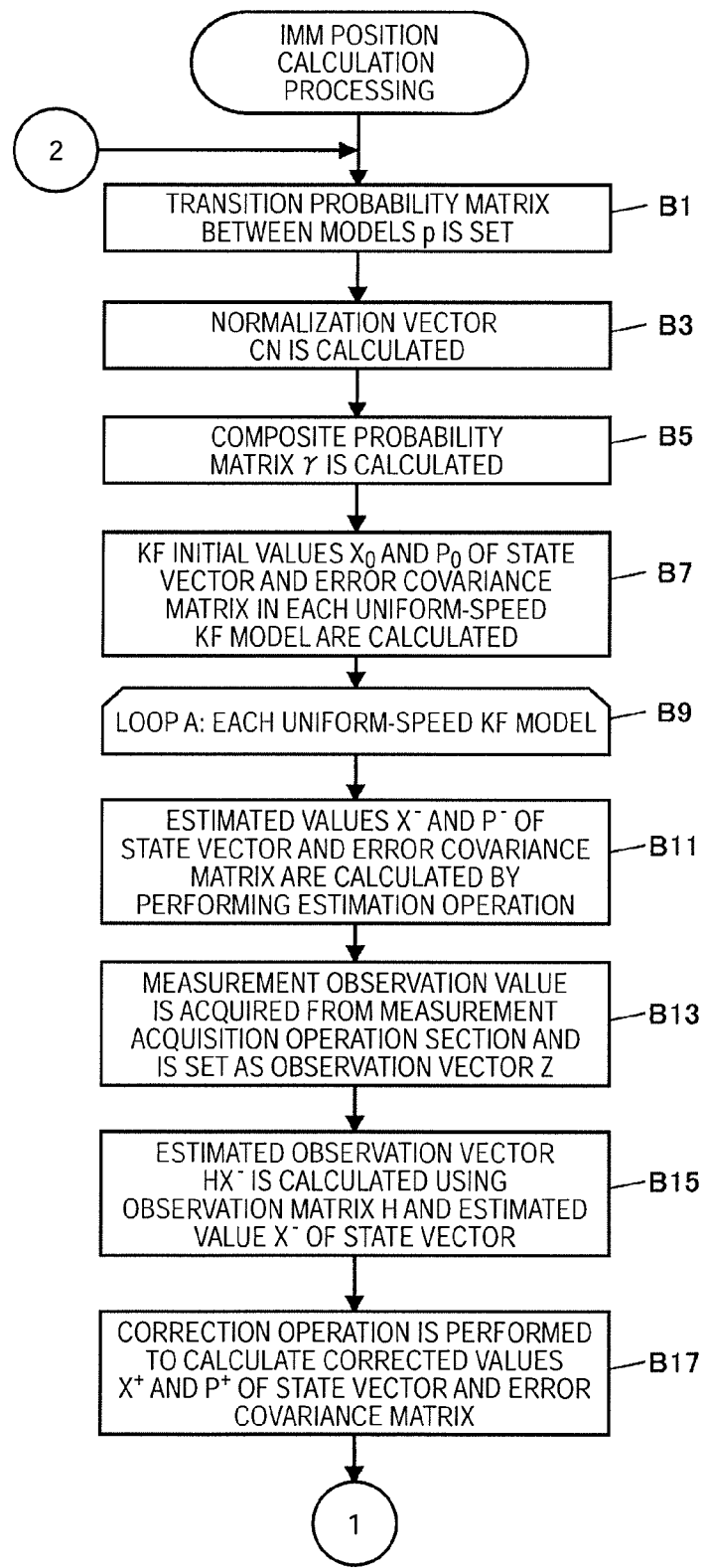
FIG. 21 is a flow chart showing the flow of IMM position calculation processing.
Figure 22:
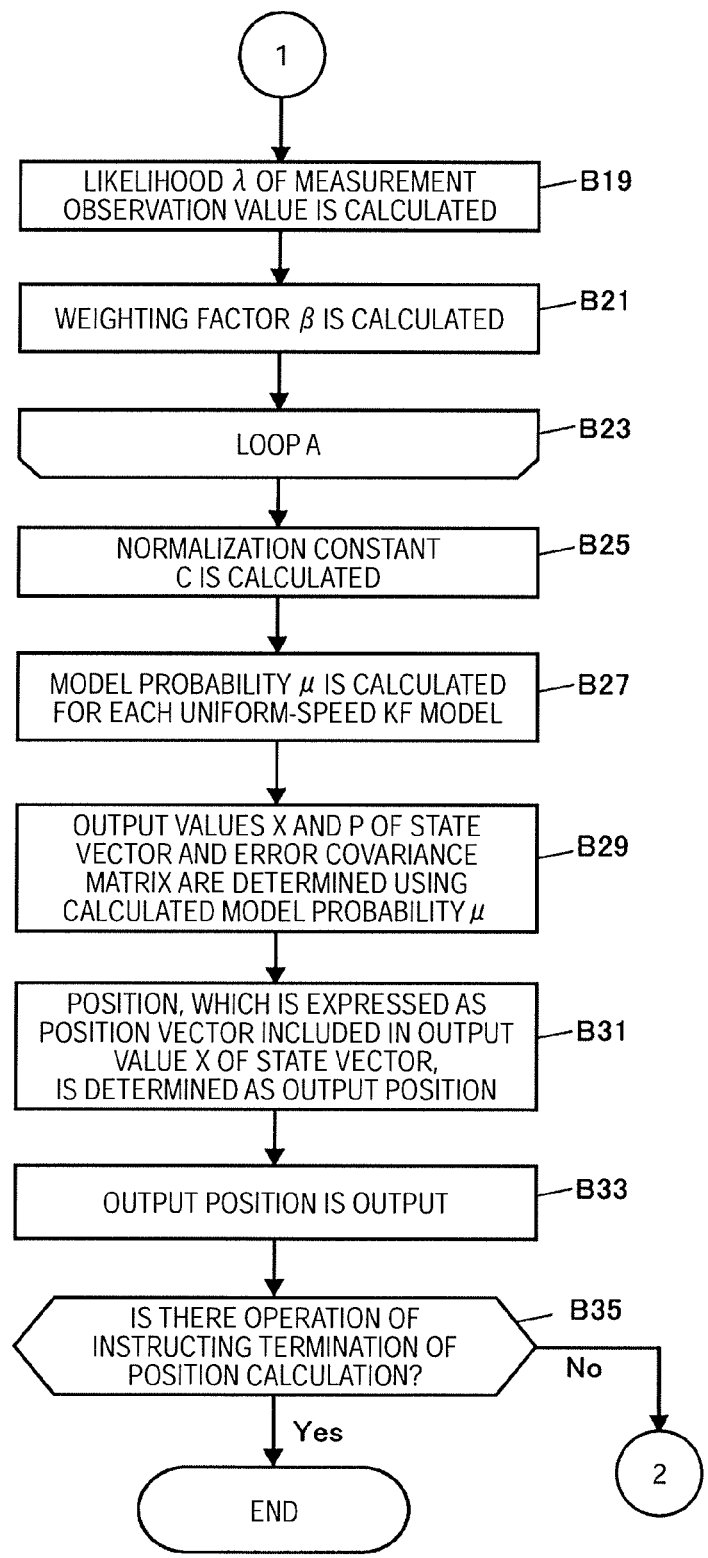
FIG. 22 is a flow chart showing the flow of IMM position calculation processing.

FIGS. 21 and 22 are flow charts showing the flow of the IMM position calculation processing. In the following expressions, it is assumed that "j" of a suffix of each variable indicates a variable corresponding to a j-th uniform-speed KF model.

First, the host CPU 40 sets the transition probability matrix between models p (step B1). The transition probability matrix between models p is expressed in a "2×2" matrix as shown in the following Expression (2).

$$p = \begin{bmatrix} p_{11} & p_{12} \\ p_{21} & p_{22} \end{bmatrix} \quad (2)$$

A component Pnm of the matrix indicates the probability of transition from an n-th uniform-speed KF model to an m-th uniform-speed KF model. For example, a component $P_{11}$ of the matrix indicates the probability of transition from a first uniform-speed KF model to the first uniform-speed KF model (itself), and a component $P_{12}$ of the matrix indicates the probability of transition from the first uniform-speed KF model to a second uniform-speed KF model. In addition, the value obtained by adding components of each row "i" is 1. That is, $P_{11}+P_{12}=1$ $P_{21}+P_{22}=1$.

Then, the host CPU 40 calculates the normalization vector CN according to the following Expression (3) (step B3).

$$CN = \begin{bmatrix} C_1 \\ C_2 \end{bmatrix} = \begin{bmatrix} p_{11} & p_{12} \\ p_{21} & p_{22} \end{bmatrix}^T \cdot \begin{bmatrix} \mu_1 \\ \mu_2 \end{bmatrix} \quad (3)$$

As can be seen from the Expression (3), the normalization vector CN is expressed as a product between a transposed matrix of the transition probability matrix between models p and the components of the model probability μ.

Then, the host CPU 40 calculates a composite probability matrix γ according to the following Expression (4) (step B5).

$$\gamma = \begin{bmatrix} \gamma_{11} & \gamma_{12} \\ \gamma_{21} & \gamma_{22} \end{bmatrix} = \begin{bmatrix} \dfrac{p_{11}\mu_1}{C_1} & \dfrac{p_{12}\mu_1}{C_2} \\ \dfrac{p_{21}\mu_2}{C_1} & \dfrac{p_{22}\mu_2}{C_2} \end{bmatrix} \quad (4)$$

As can be seen from the Expression (4), the composite probability matrix γ is calculated using the components of the transition probability between models p, the components of the model probability μ, and the components of the normalization vector CN.

Then, the host CPU 40 calculates the initial value $X_{0j}$ of a state vector and the initial value $P_{0j}$ of an error covariance matrix in each uniform-speed KF model according to the following Expressions (5) and (6) (step B7).

$$X_{0j}=X_1\gamma_{1j}+X_2\gamma_{2j} \quad (5)$$

$$P_{0j}=\gamma_{1j}[P_1+(X_1-X_{0j})(\bullet)^T]+\gamma_{2j}[P_2+(X_2-X_{0j})(\bullet)^T] \quad (6)$$

Subsequently, the host CPU 40 executes processing of loop A for each of the two kinds of uniform-speed KF models (steps B9 to B23). In the processing of loop A, the host CPU 40 calculates the estimated value $X^-$ of the state vector and the estimated value $P^-$ of the error covariance matrix by performing an estimation operation for the state vector X and the error covariance matrix P according to the following Expressions (7) and (8) (step B11).

$$X_j^-=\phi_j X_{0j} \quad (7)$$

$$P_j^-=\phi_j P_{0j}\phi_j^T+Q_j \quad (8)$$

The host CPU 40 performs the estimation operation using a state transition matrix for uniform-speed KF models φv, which is shown in FIG. 23, as a state transition matrix for first and second uniform-speed KF models. The state transition matrix is a "8×8" matrix, and the arrangement of the rows and the columns corresponds to the arrangement of the components of the state vector X.

In the state transition matrix φ, all diagonal components are 1. Moreover, in a "3×3" matrix portion MP3 in which the position and the moving speed cross each other, the diagonal components are dt. Regarding dt, if the state transition matrix φ is multiplied by the state vector X, "moving speed×dt" is added to the position (x+u×dt, y+v×dt, z+w×dt). Accordingly, the estimated position of the movable body is calculated on the assumption that the movable body moves at a uniform speed.

Then, the host CPU 40 acquires the received frequency and code phase of the GPS satellite signal as the measurement observation values and sets them as an observation vector Z for a corresponding uniform-speed KF model (step B13). Then, the host CPU 40 calculates an estimated observation vector $HX^-$ by multiplying the estimated value $X^-$ of the state vector calculated in step B11 by a predetermined observation matrix H (step B15).

The observation matrix H is a matrix for estimating the received frequency and code phase of a GPS satellite signal, which are components of the observation vector Z, using each component of the estimated value $X^-$ of the state vector. Since the observation matrix H is a "2×8" matrix and the estimated value $X^-$ of the state vector is a "8×1" matrix, the estimated observation vector $HX^-$ is calculated as a "2×1" matrix.

Then, the host CPU 40 corrects the estimated value $X^-$ of the state vector and the estimated value $P^-$ of the error covariance matrix, which were calculated in step B11, by performing a correction operation according to the following Expressions (9) to (11), thereby calculating the corrected value $X^+$ of the state vector and the corrected value $P^+$ of the error covariance matrix (step B17).

$$K_j=P_j^-H_j^T E[V_j]^{-1}=P_j^-H_j^T[H_jP_j^-H_j^T+R_j]^{-1} \quad (9)$$

$$X_j=X_j^+=X_j^-+K_jV_j=X_j^-+K_j[Z_j-H_jX_j^-] \quad (10)$$

$$P_j=P_j^+=[I-K_jH_j]P_j^- \quad (11)$$

Then, the host CPU 40 calculates the likelihood λ indicating the likelihood of the measurement observation value Z according to the following Expression (12) (step B19). Then, the host CPU 40 calculates a weighting factor β according to the following Expression (13) (step B21).

$$\lambda_j = \beta_j \exp(-0.5(V_j^T \cdot E[V_j]^{-1} \cdot V_j)) \quad (12)$$
$$= \beta_j \exp\left(-0.5\{(Z_j - H_jX_j)^T(H_jP_jH_j^T + R_j)^{-1}(Z_j - H_jX_j)\}\right)$$

$$\beta_j = \frac{1}{\sqrt{(2\pi)^N|E[V_j]|}} = \frac{1}{\sqrt{(2\pi)^N|H_jP_jH_j^T + R_j|}} \quad (13)$$

Here, "N" indicates the number of measurement observation values.

After performing the processing of steps B11 to B21 for all uniform KF models, the host CPU 40 ends the processing of loop A (step B23). After completing the processing of loop A, the host CPU 40 calculates a normalization constant C according to the following Expression (14) (step B25).

$$C=\lambda_1 C_1+\lambda_2 C_2 \quad (14)$$

The normalization constant C is a constant for normalizing the model probability μ to be a value in the range of [0, 1] and is calculated on the basis of each component of the likelihood λ, and each component of the normalization vector CN.

Then, the host CPU 40 calculates the model probability μ for each uniform-speed KF model according to the following expression (15) (step B27).

$$\mu_j = \frac{\lambda_j C_j}{C} \quad (15)$$

Then, using the model probability μ calculated in step B27, the host CPU 40 determines the output value X of the state vector and the output value P of the error covariance matrix according to the following Expressions (16) and (17) (step B29).

$$X = X_1\mu_1 + X_2\mu_2 \quad (16)$$

$$P = \mu_1[P_1 + (X_1 - X)(●)^T] + \mu_2[P_2 + (X_2 - X)(●)^T] \quad (17)$$

Then, the host CPU 40 determines the position, which is expressed by the three-dimensional position (x, y, z) included in the output value X of the state vector, as the output position (step B31). Then, the host CPU 40 generates a navigation screen, on which the output position is plotted, and displays the navigation screen on the display section 60 (step B33).

Then, the host CPU 40 determines whether or not the user has instructed termination of the position calculation using the operating section 50 (step B35). When it is determined that there is no instruction (step B35; No), the process returns to step B1. In addition, when it is determined that the termination of position calculation has been instructed (step B35; Yes), the IMM position calculation processing ends.

After returning to the main processing of FIG. 20 to perform the processing of one of the steps A3 to A7, the host CPU 40 determines whether or not the user has performed a power off instruction operation using the operating section 50 (step A9). Then, when it is determined that the power off instruction operation has not been performed (step A9; No), the process returns to step A1. In addition, when it is determined that the power off instruction operation has been performed (step A9; Yes), the main processing ends.

6. Operations and Effects

The mobile phone 1 determines the output position by performing the position calculation processing based on the interactive mixing model (IMM) using two kinds of uniform-speed KF models of the first and second uniform-speed KF models indicating that the movable body is in the uniform motion state. Regarding the first and second uniform-speed KF models, the state transition matrix which is a kind of a parameter in the KF is the same but the system noise which is a kind of an error parameter is set to a different value.

In the present embodiment, the position is calculated using two kinds of uniform-speed KF models without using the fixed point KF model or the constant acceleration KF model. As a result, it is possible to prevent the opposite event from being selected, like the case where the fixed point KF model was selected even though the movable body was moving, or on the contrary, the constant acceleration KF model was selected even though the movable body had stopped.

Moreover, in the present embodiment, the acceleration of a movable body was reflected in the value of system noise by regarding it as an error component. That is, according to a plurality of power spectral density groups classified by performing in advance the frequency analysis of the acceleration of the movable body, the value of system noise of each of the first and second uniform-speed KF models was set. As a result, it was successful in improving the accuracy of position calculation.

7. Modifications 7-1. Electronic Apparatus

Moreover, the invention may be applied not only to the mobile phone but also to any kind of electronic apparatus as long as the electronic apparatus includes a position calculating device. For example, the invention may also be applied similarly to a notebook computer, a PDA (personal digital assistant), a car navigation apparatus, and a portable navigation apparatus.

7-2. Satellite Position Calculating System

In the above embodiment, an explanation has been made using a GPS as an example of a satellite position calculating system. However, other satellite position calculating systems may also be used, such as WAAS (wide area augmentation system), QZSS (quasi zenith satellite system), GLONASS (global navigation satellite system), and GALILEO.

7-3. Division of Processing

Some or all of processing that the host CPU 40 executes may be performed by the operation control section 31 of the baseband processing circuit section 30. For example, the host CPU 40 does not perform the IMM position calculation processing, and the operation control section 31 performs the IMM position calculation processing using the measurement observation value calculated by the measurement acquisition operation section 33.

7-4. Kinds of Uniform-Speed KF Models

Although the position calculation is performed by the IMM using two kinds of uniform-speed KF models in the above embodiment, the position calculation may also be performed by the IMM using three or more kinds of uniform-speed KF models. In this case, it is preferable that the position calculation is performed by the IMM using a plurality of uniform-speed KF models with a different system noise matrix Q which is a kind of an error parameter.

7-5. Frequency Analysis of Acceleration Component

In the above embodiment, the case where the acceleration component of a movable body was acquired by differentiating the moving speed vector calculated using a known GPS receiver and the frequency analysis was performed in the field test was described as an example. This may be a configuration in which the acceleration component is acquired using a GPS receiver mounted with the IMM of three models (fixed point, uniform speed, and constant acceleration).

As described above, in the IMM of three models, the position calculation processing based on the IMM may be performed using the state vector of a "11×1" matrix which has as components three-dimensional position (x, y, z), three-dimensional moving speed (u, v, w), and three-dimensional acceleration ($a_x$, $a_y$, $a_z$) of a position calculating device, a clock bias b, and a clock drift d.

For example, the histogram of power spectral density shown in FIG. 5 may be created by performing the position calculation processing based on the IMM in the field test in order to calculate the output value X of the state vector and performing the frequency analysis of the three-dimensional acceleration ($a_x$, $a_y$, $a_z$) included in the output value X. In addition, a method may be considered in which the system noise matrix Q is determined on the basis of the distribution of power spectral density obtained from the created histogram.

What is claimed is:

1. A position calculating method comprising:
   executing position calculation processing using a plurality of Kalman filter processing, which is processing corresponding to each of a plurality of power spectral density groups classified by performing in advance frequency analysis on the movement acceleration of a movable body as an object of position calculation and which includes an error parameter set to a different value according to the power spectral density group and a parameter indicating that the movable body is in a uniform motion state, on the basis of a satellite signal from a positioning satellite; and
   determining the position of the movable body using a position calculated by each Kalman filter processing.

2. The position calculating method according to claim 1,
   wherein a position change allowance parameter indicating the tolerance of a position change is included in the error parameter, and
   in the Kalman filter processing, the values of the position change allowance parameter are different.

3. The position calculating method according to claim 2,
   wherein the value of the position change allowance parameter is a value that is set assuming movements with different acceleration.

4. The position calculating method according to claim 1,
   wherein the Kalman filter processing is two kinds of Kalman filter processing.

5. A position calculating device comprising:
   a calculation section that executes position calculation processing using a plurality of Kalman filter processing, which is processing corresponding to each of a plurality of power spectral density groups classified by performing in advance frequency analysis on the movement acceleration of a movable body as an object of position calculation and which includes an error parameter set to a different value according to the power spectral density group and a parameter indicating that the movable body is in a uniform motion state, on the basis of a satellite signal from a positioning satellite; and
   a position determining section that determines the position of the movable body using a position calculated by each Kalman filter processing.

* * * * *